US012672223B2

(12) United States Patent
O'Donnell et al.

(10) Patent No.: US 12,672,223 B2
(45) Date of Patent: Jun. 30, 2026

(54) LOAD CONTROL SYSTEM COMPRISING LINEAR LIGHTING FIXTURES

(71) Applicant: Lutron Technology Company LLC, Coopersburg, PA (US)

(72) Inventors: Devin O'Donnell, Grand Rapids, MI (US); Daniel C. Raneri, Boston, MA (US); Ratan Dominic Rego, Center Valley, PA (US); Christopher G. Udall, Plainville, MA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/769,910

(22) Filed: Jul. 11, 2024

(65) Prior Publication Data

US 2024/0365459 A1 Oct. 31, 2024

Related U.S. Application Data

(63) Continuation of application No. 18/209,610, filed on Jun. 14, 2023, now Pat. No. 12,089,315, which is a (Continued)

(51) Int. Cl.
*H05B 47/115* (2020.01)
*H05B 47/175* (2020.01)
(Continued)

(52) U.S. Cl.
CPC ......... *H05B 47/185* (2020.01); *H05B 47/115* (2020.01); *H05B 47/19* (2020.01);
(Continued)

(58) Field of Classification Search
CPC .... H05B 47/115; H05B 47/185; H05B 47/19; H05B 47/1965; H05B 47/199; H05B 47/1975; H05B 47/1985
See application file for complete search history.

(56) References Cited

U.S. PATENT DOCUMENTS 7,369,060 B2 5/2008 Veskovic et al.
7,391,297 B2 6/2008 Cash et al.
(Continued)

FOREIGN PATENT DOCUMENTS

CA 3174192 A1 * 11/2021 ............ H05B 45/10
CA 3115286 A1 * 12/2021
(Continued)

*Primary Examiner* — Adam D Houston
(74) *Attorney, Agent, or Firm* — Flaster Greenberg P.C.

(57) ABSTRACT

A linear lighting fixture may comprise lighting control devices for controlling lighting loads in a load control system. Each linear lighting fixture may include a fixture controller configured to control lighting control devices. The fixture controller may receive messages from one or more devices in the load control system for controlling lighting control devices in the linear lighting fixture. The fixture controller may receive the message and communicate with the lighting control devices on a wired power/communication link Each linear lighting fixture may comprise one or more sensors. The sensors may be coupled to the fixture controller to send/receive messages on a wired power/communication link and/or a wireless communication link. The lighting control devices in the fixtures may be zoned separately or together. Each of the sensors in a linear lighting fixture may be zoned with one or more of the lighting control devices in the linear lighting fixture.

20 Claims, 9 Drawing Sheets

Related U.S. Application Data continuation of application No. 17/478,769, filed on Sep. 17, 2021, now Pat. No. 11,743,996.

(60) Provisional application No. 63/080,370, filed on Sep. 18, 2020.

(51) Int. Cl.
*H05B 47/185* (2020.01)
*H05B 47/19* (2020.01)

(52) U.S. Cl.
CPC ....... *H05B 47/1965* (2024.01); *H05B 47/199* (2024.01); *H05B 47/1975* (2024.01); *H05B 47/1985* (2024.01)

(56) References Cited

U.S. PATENT DOCUMENTS

| | | | | |
|---|---|---|---|---|
| 8,009,042 | B2 | 8/2011 | Steiner et al. | |
| 8,199,010 | B2 | 6/2012 | Sloan et al. | |
| 8,228,184 | B2 | 7/2012 | Blakeley et al. | |
| 8,330,638 | B2 | 12/2012 | Altonen et al. | |
| 8,410,706 | B2 | 4/2013 | Steiner et al. | |
| 8,451,116 | B2 | 5/2013 | Steiner et al. | |
| 8,760,262 | B2 | 6/2014 | Veskovic | |
| 9,553,451 | B2 | 1/2017 | Zacharchuk et al. | |
| 9,595,880 | B2 | 3/2017 | Knode et al. | |
| 9,622,323 | B2 | 4/2017 | Hartman et al. | |
| 9,726,332 | B1 | 8/2017 | May | |
| 9,854,653 | B1 * | 12/2017 | Ackmann | H05B 47/115 |
| 9,888,543 | B2 | 2/2018 | Chitta et al. | |
| 9,913,353 | B1 | 3/2018 | Ackmann et al. | |
| 9,954,435 | B2 | 4/2018 | Knauss et al. | |
| 10,236,789 | B2 | 3/2019 | Steiner et al. | |
| 10,264,651 | B2 | 4/2019 | Steiner | |
| 10,379,505 | B2 | 8/2019 | Barco et al. | |
| 10,398,007 | B2 | 8/2019 | Pearson et al. | |
| 11,079,421 | B2 | 8/2021 | Camden et al. | |
| 11,259,389 | B1 | 2/2022 | Camden et al. | |
| 11,601,010 | B2 | 3/2023 | Zaveruha et al. | |
| 11,743,996 | B1 * | 8/2023 | Udall | H05B 47/185 315/291 |
| 2005/0001557 | A1 | 1/2005 | Walko et al. | |
| 2005/0159848 | A1 * | 7/2005 | Shah | F24F 11/30 700/277 |
| 2008/0092075 | A1 | 4/2008 | Jacob et al. | |
| 2008/0094005 | A1 | 4/2008 | Rabiner et al. | |
| 2011/0029139 | A1 | 2/2011 | Altonen et al. | |
| 2011/0121654 | A1 | 5/2011 | Recker et al. | |
| 2011/0127340 | A1 * | 6/2011 | Aiken | F24F 11/63 700/277 |
| 2012/0206050 | A1 | 8/2012 | Spero | |
| 2012/0286940 | A1 | 11/2012 | Carmen et al. | |
| 2013/0030589 | A1 | 1/2013 | Pessina et al. | |
| 2014/0265568 | A1 | 9/2014 | Crafts et al. | |
| 2015/0295411 | A1 | 10/2015 | Gill et al. | |
| 2016/0054023 | A1 | 2/2016 | Protzman et al. | |
| 2016/0139576 | A1 * | 5/2016 | Aiken | H04W 4/80 315/297 |
| 2017/0090499 | A1 | 3/2017 | Dolan | |
| 2018/0066816 | A1 * | 3/2018 | Clark | F21S 2/005 |
| 2018/0167547 | A1 | 6/2018 | Casey et al. | |
| 2018/0203591 | A1 | 7/2018 | Callen et al. | |
| 2020/0068688 | A1 | 2/2020 | Knauss et al. | |
| 2020/0257831 | A1 | 8/2020 | Boudreau et al. | |
| 2020/0374996 | A1 * | 11/2020 | Bames | G06F 3/04847 |
| 2021/0045220 | A1 * | 2/2021 | Barna | H05B 47/19 |
| 2021/0051788 | A1 | 2/2021 | Dolan | |
| 2021/0083897 | A1 | 3/2021 | Barna et al. | |
| 2021/0162912 | A1 | 6/2021 | Spero | |
| 2022/0039240 | A1 | 2/2022 | Steiner et al. | |
| 2022/0039243 | A1 | 2/2022 | Bocock et al. | |
| 2022/0070982 | A1 * | 3/2022 | Hussell | H05B 47/19 |
| 2023/0313977 | A1 * | 10/2023 | Takacs | F21V 17/002 439/38 |
| 2024/0220337 | A1 * | 7/2024 | Shrivastava | G06F 9/54 |

FOREIGN PATENT DOCUMENTS

| | | | | |
|---|---|---|---|---|
| CA | 3216259 A1 | * | 10/2022 | H05B 47/1985 |
| EP | 4054295 B1 | * | 6/2025 | H05B 7/196 |
| KR | 20190115899 A | * | 10/2019 | H05B 37/0227 |
| WO | WO-2022164500 A1 | * | 8/2022 | G01V 8/00 |

* cited by examiner

LOAD CONTROL SYSTEM COMPRISING LINEAR LIGHTING FIXTURES

CROSS-REFERENCE TO RELATED APPLICATIONS

This application is a continuation of U.S. Non-Provisional patent application Ser. No. 18/209,610, filed Jun. 14, 2023, which is a continuation of U.S. Non-Provisional patent application Ser. No. 17/478,769, filed Sep. 17, 2021, which issued as U.S. Pat. No. 11,743,996 on Aug. 29, 2023, which claims priority to U.S. Provisional Patent Application No. 63/080,370, filed Sep. 18, 2020 and entitled LOAD CONTROL SYSTEM COMPRISING LINEAR LIGHTING FIXTURES, the entire disclosure of which is incorporated by reference herein in its entirety.

BACKGROUND

A user environment, such as a residence or an office building, for example, may be configured with a lighting control system. The lighting control system may be used to control the lighting loads providing artificial light in the user environment. Each load control system may include various control devices, including input devices and lighting control devices. The lighting control devices may receive messages from the input devices, which may include load control instructions, for controlling a corresponding electrical load. Examples of lighting control devices may include a dimmer switch, an electronic switch, a ballast, or a light-emitting diode (LED) driver. Examples of input devices may include remote control devices or sensors (e.g., occupancy sensors, daylight sensors, temperature sensors, and/or the like). Remote control devices may receive user input for performing lighting control. Sensor devices may detect sensor events for performing lighting control.

SUMMARY

A linear lighting fixture or linear lighting fixtures may comprise a lighting control device or lighting control devices for controlling lighting loads in a load control system. For example, the lighting loads may include a number of different colored light emitting diodes (LEDs). Each linear lighting fixture may have multiple lighting loads/lighting control devices for controlling the lighting intensity in the load control system.

Each linear lighting fixture may include a fixture controller configured to control the lighting control devices. The fixture controller may receive messages from one or more devices in the load control system for controlling lighting control devices in the linear lighting fixture. The fixture controller may receive the message and communicate with the lighting control devices on a wired power/communication link. The fixture controller of the linear lighting fixtures may be configured to receive messages from the one or more device in the load control system via wired and/or wireless signals. For example, the fixture controller may comprise one or more communication circuits for sending and/or receiving messages via radio frequency (RF) signals. The fixture controller may receive feedback messages from the lighting control devices via the wired power/communication link that indicate the intensity level and/or color of the respective lighting loads.

Each linear lighting fixture may comprise one or more sensors. For example, each linear lighting fixture may comprise one or more occupancy sensors configured to detect occupancy and/or vacancy in a space in which the linear lighting fixture is installed. The number of sensors in each linear lighting fixture may be configurable. The sensors may be coupled to the fixture controller to send/receive messages, for example on a wired power/communication link. The sensors may communicate with the fixture controller on the same wired power/communication link as the lighting control devices, or the sensors may communicate with the fixture controller on a separate wired power/communication link. In another example, the sensors may be capable of wireless communication with the fixture controller. For example, the sensor may provide occupancy information to the fixture controller, and the fixture controller may control the lighting control devices in response to the occupancy information, received via RF signals from the sensors.

The lighting control devices in the linear lighting fixtures may be zoned separately or together. For example, one or more lighting control devices in a linear lighting fixture may be configured in a zone, such that common control may be performed for each of the lighting control devices in the zone. Each of the sensors in a linear lighting fixture of the load control system may be zoned with one or more of the lighting control devices in the linear lighting fixture. For example, each of the sensors in a linear lighting fixture may be in the same zone for controlling each of the lighting control devices in the linear lighting fixture, or the sensors in the linear lighting fixture may be zoned with one or more lighting control devices that comprise a subset of the lighting control devices in the linear lighting fixture. The zones of may be stored in memory at the fixture controller of the linear lighting fixture for performing control in response to messages received by the fixture controller. For example, when the fixture controller receives a message from an occupancy sensor of the linear lighting fixture, the fixture controller may control the zone of lighting control devices that are associated in memory with the same zone as the occupancy sensor from which the message was received. The zones in the linear lighting fixture may be configurable. In an example, each sensor may be zoned to control a corresponding lighting control device or a predefined number of lighting control devices within its proximity.

Each of the linear lighting fixtures of the load control system may comprise one or more segments. Each segment may be attached enabling mechanical, electrical, and/or communicative coupling of the segments of the linear lighting fixture. For example, once a first segment is attached (e.g., affixed) to a second segment, a wired power/communication link may enable the electrical and/or communicative coupling. Similarly, once second segment is attached to segment a third segment the wired power/communication link may enable the electrical and/or communicative coupling.

Each of the lighting control devices in the linear lighting may separately receive power from an AC power source and provide power to other components (e.g., the sensors) in the linear lighting fixture. For example, each segment of the linear lighting fixture may comprise a lighting control device that receives power from an AC power source and provides power to the other components (e.g., the sensors) in their respective segments via the wired power/communication link. The lighting control device in the first segment may provide power to the fixture controller of the first segment.

In another example, a single lighting control device may receive power from an AC power source and provide power to the other segments. For example, the lighting control device of a first segment may receive power from an AC power source and provide power to via the wired power/ communication link to a second segment such that power may be provided to the lighting control devices and/or the sensors of the second segment via the wired power/communication link. Similarly, a third segment may be electrically coupled to the second segment, such that power may be provided to the lighting control device and/or the sensor of the third segment via the wired power/communication link Attaching the second segment to the first segment may enable communication of messages on the wired power/communication link between the fixture controller of the first segment and the lighting control devices and/or the sensors installed in the second segment. For example, different segments may have different numbers of lighting control devices and/or sensors (or ports for installing sensors). Different types of sensors may be installed in different segments for enabling different functionality.

Each linear lighting fixture may be commissioned in response to an input received at a remote control device and/or a mobile device. For example, a user may use the mobile device to commission components such as the lighting control devices, the sensors, and/or the fixture controller of the linear lighting fixtures. The commissioning may result in generation of configuration information that may be stored at the mobile device, the system controller, and/or the fixture controller. The mobile device may be capable of commissioning the linear lighting fixtures using RF signals, for example. The mobile device may communicate directly with the fixture controller via the RF communication signals in response to the user input to configure the linear lighting fixtures during commissioning, or the RF communication signals may be communicated via an intermediary device, such as the system controller.

To confirm that the segments of the linear lighting fixtures have been properly attached, a verification procedure may be performed to verify the proper attachment of the segments of the linear lighting fixtures. The verification procedure may confirm proper setup and installation for the preconfigured operation. A verification message may be transmitted by a remote control device or the mobile device in response to a user actuation and received by at least one of the fixture controllers. In response to the verification message, the fixture controller(s) may send a message to the sensors, one of which may be located in each segment of the linear lighting fixture. Each sensor in the linear lighting fixture may receive the verification message and respond with a message that includes the unique identifier of the sensor. The fixture controller may receive the messages from each of the sensors and record a signal strength identifier (e.g., RSSI value) at which each of the messages are received from the sensors. From the signal strength identifiers (e.g., RSSI values), the fixture controller may determine the relative distance of each of the sensors from the fixture controller, and thus the relative distance of the corresponding segments in which the sensors are installed. The fixture controller may use the signal strength identifiers (e.g., RSSI values) to determine the order in which the segments are installed. For example, the fixture controller may have prestored thereon the order in which the segments and/or the sensors within the segments should be installed. For example, the control device may identify from the order that the second and third segments are out of order and instruct the user to switch the order of these segments. The mobile device and/or the lighting loads may provide feedback verify to the user that the segments have been installed in the proper order and/or indicate to the user how to attach the segments appropriately.

Each of the linear lighting fixtures of the load control systems may have out-of-the-box functionality. For example, the number of sensors in each linear lighting fixture, the zones of lighting control devices, associations between various devices in the system, control parameters for control of lights in response to sensors, and/or the like may be preconfigured in the memory of the fixture controller, such that the linear lighting fixtures may be able to be installed and perform control out of the box. In examples, the segments of the linear lighting fixtures may be attached in a predefined order to enable a preconfigured operation out of the box. For example, the segments may be preconfigured to be attached to form the linear lighting fixture to build a preconfigured linear lighting fixture by attaching to one or more of the other segments. The verification procedure may be preconfigured in the memory of the fixture controller, the remote device, and/or the mobile device such that the order of one or more segments is stored and the user performing installation may be able to perform the verification procedure to ensure out-of-the-box functionality.

DETAILED DESCRIPTION

Figure 1:
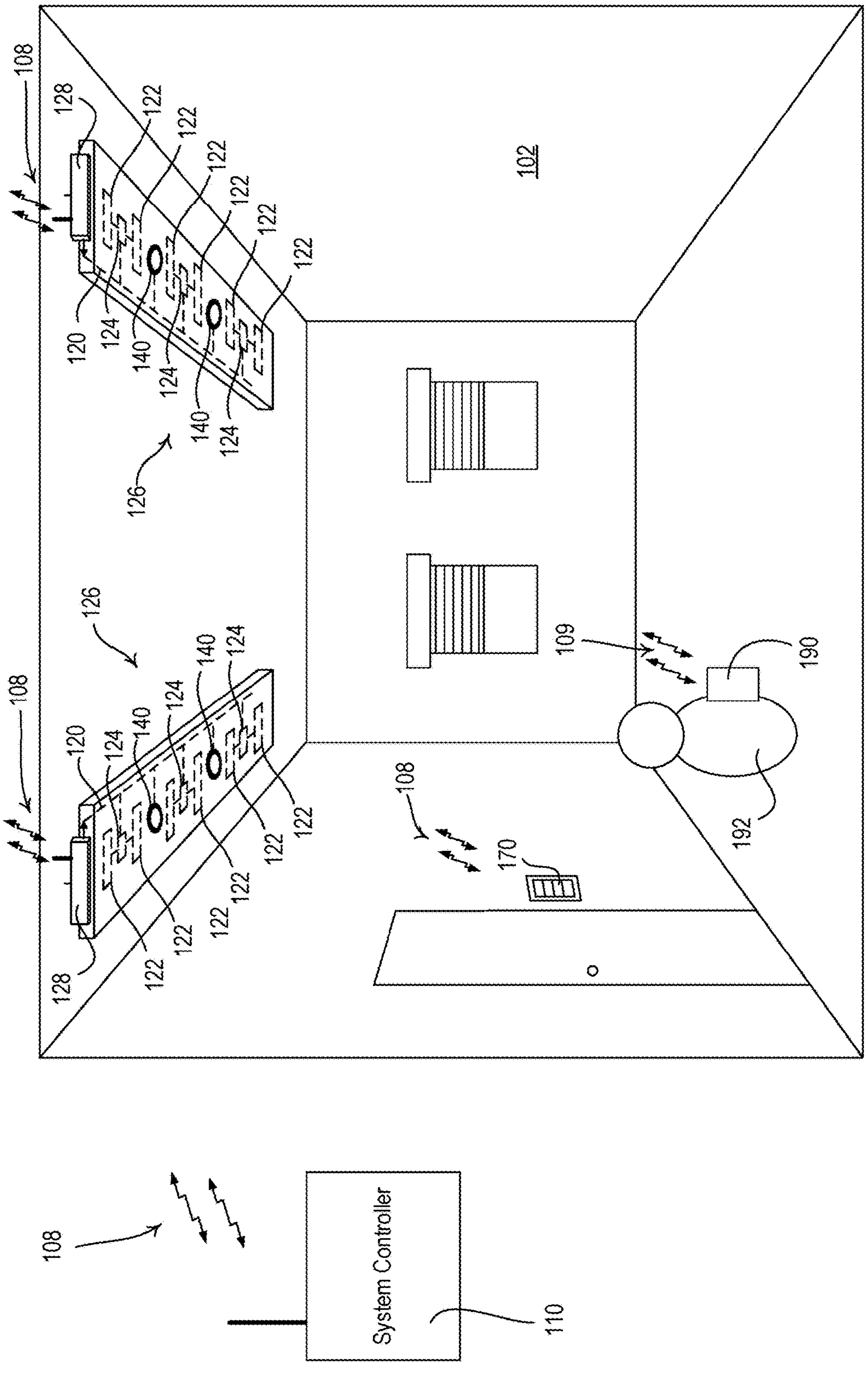
FIG. 1 is a diagram of an example load control system.

FIG. 1 is a diagram of an example load control system 100 for controlling the amount of power delivered from an alternating-current (AC) power source (not shown) to one or more electrical loads. The load control system 100 may be installed in a load control environment 102. The load control environment 102 may include a space in a residential or commercial building. For example, the load control system 100 may be installed in one or more rooms on one or more floors in the building.

The load control system 100 may comprise a plurality of control devices. The control devices may include load control devices that are configured to control one or more electrical loads in the load control environment 102 (also referred to as a user environment). For example, the load control devices may control the one or more electrical loads in response to input from one or more input devices or other devices in the load control system 100.

The load control devices in the load control system 100 may include lighting control devices. For example, the load control system 100 may include lighting control devices 124 for controlling respective lighting load(s) 122 in a corresponding lighting fixture 126. For example, the lighting load(s) 122 may each include a number of different colored light emitting diodes (LEDs). The lighting control devices 124 may comprise light-emitting diode (LED) drivers and the lighting loads 122 may comprise LED light sources. The diagram of the example load control system 100 in FIG. 1 shows a perspective view of linear lighting fixtures 126 installed in the load control system 100 that each comprises multiple lighting control devices 124 and lighting loads 122. While each lighting fixture 126 is shown having multiple lighting loads 122, each lighting fixture 126 may comprise one or more individual light sources (e.g., lamps and/or LED emitters) that may be controlled individually and/or in unison by a respective lighting control device. Though an LED driver is provided as an example lighting control device, other types of lighting control devices may be implemented as load control devices in the load control system 100. For example, the load control system 100 may comprise dimmer switches, electronic dimming ballasts for controlling fluorescent lamps, or other lighting control devices for controlling corresponding lighting loads. The lighting control devices 124 may be configured to directly control an amount of power provided to the lighting loads 122. The lighting control devices 124 may control the intensity level and/or color (e.g., color temperature) of the respective lighting loads 122.

The input devices in the load control system 100 may be capable of receiving an input event for controlling one or more load control devices in the load control system 100. The input devices and the load control devices may be collectively referred to as control devices in the load control system 100. The input devices in the load control system 100 may comprise one or more remote control devices, such as a remote control device 170. The remote control device may be battery-powered. The remote control device 170 may be configured to transmit messages via RF signals 108 to one or more other devices in the load control system 100 in response to an input event, such as an actuation of one or more buttons or a rotation of a rotary knob of the remote control device 170. For example, the remote control device 170 may transmit messages to the load control devices via the RF signals 108 in response to actuation of one or more buttons located thereon.

The RF signals 108 may be transmitted using a proprietary RF protocol, such as the CLEAR CONNECT protocol (e.g., CLEAR CONNECT TYPE A and/or CLEAR CONNECT TYPE X protocols). Alternatively, the RF signals 108 may be transmitted using a different RF protocol, such as, a standard protocol, for example, one of WIFI, cellular (e.g., 3G, 4G LTE, 5G NR, or other cellular protocol), BLUETOOTH, BLUETOOTH LOW ENERGY (BLE), ZIGBEE, Z-WAVE, THREAD, KNX-RF, ENOCEAN RADIO protocols, or a different protocol. In an example, the remote control device 170 and/or other input devices may transmit messages to the load control devices via the RF signals 108 that comprise input events (e.g., button presses, sensor measurement events, or other input event) or control instructions generated in response to the input events for performing control of the electrical loads controlled by the load control devices. Though communication links may be described as a wireless communication links, wired communication links may similarly be implemented for enabling communications herein.

The remote control device 170 may also communicate with other devices in the load control system 100 via a wired communication link. In response to an input event at the remote control device 170, a device to which the remote control device 170 is wired may be triggered to transmit messages to one or more other devices in the load control system 100. The remote control device 170 may comprise a keypad. In another example, the remote control device 170 may comprise a rotary knob configured to transmit messages to one or more other devices in response to a rotation on the rotary knob (e.g., rotation of a predefined distance or for a predefined period of time). The remote control device 170 may be mounted to a structure, such as a wall, a toggle actuator of a mechanical switch, or a pedestal to be located on a horizontal surface. In another example, the remote control device 170 may be handheld. The remote control device 170 may provide feedback (e.g., visual feedback) to a user of the remote control device 170 on a visual indicator, such as a status indicator. The status indicator may be illuminated by one or more light emitting diodes (LEDs) for providing feedback. The status indicator may provide different types of feedback. The feedback may include feedback indicating actuations by a user or other user interface event, a status of electrical loads being controlled by the remote control device 170, and/or a status of the load control devices being controlled by the remote control device 170. The feedback may be displayed in response to user interface events and/or in response to messages received that indicate the status of load control devices and/or electrical loads. Examples of battery-powered remote control devices are described in greater detail in commonly-assigned U.S. Pat. No. 8,330,638, issued Dec. 11, 2012, entitled. WIRELESS BATTERY-POWERED REMOTE CONTROL HAVING MULTIPLE MOUNTING MEANS, and U.S. Patent Application Publication No. 2012/0286940, published Nov. 15, 2012, entitled CONTROL DEVICE HAVING A NIGHT-LIGHT, the entire disclosures of which are hereby incorporated by reference.

The input devices of the load control system 100 may comprise one or more sensor devices, such as sensor devices 140. The load control system 100 may comprise other types of input devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., such as power meters, energy meters, utility submeters, utility rate meters, etc.), central control transmitters, residential, commercial, or industrial controllers, and/or any combination thereof.

The sensor devices 140 may be configured to transmit messages via the RF signals 108 to one or more other devices in the load control system 100 in response to an input event, such as a sensor measurement event. The sensor devices 140 may also or alternatively be configured to transmit messages via a wired communication link to one or more other devices in the load control system 100 and/or in the lighting fixtures 126 in response to an input event, such as a sensor measurement event.

The sensor devices 140 may be configured to operate as ambient light sensors or daylight sensors and may be configured to perform a sensor measurement event by measuring a total light intensity in the space around the sensor devices 140. The sensor devices 140 may transmit messages including the measured light level or control instructions for controlling the intensities and/or color of the lighting loads 122 in response to the measured light level. Examples of RF load control systems having daylight sensors are described in greater detail in commonly assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY POWERED DAYLIGHT SENSOR, the entire disclosures of which are hereby incorporated by reference.

The sensor devices 140 may be configured to operate as occupancy sensors and/or vacancy sensors configured to detect occupancy and/or vacancy conditions in the load control environment 102. The sensor devices 140 may be configured to perform the sensor measurement event by measuring an occupancy condition or a vacancy condition in response to occupancy or vacancy, respectively, of the load control environment 102 by the user 192. For example, the sensor devices 140 may comprise an infrared (IR) sensor capable of detecting the occupancy condition or the vacancy condition in response to the presence or absence, respectively, of the user 192. The sensor devices 140 may transmit messages including the occupancy conditions or vacancy conditions, or control instructions configured to control the intensity and/or color of the lighting loads 122 in response to the occupancy/vacancy conditions, via the RF signals 108 or via a wired communication link. For example, the lighting control devices 124 may be configured to receive messages from the sensor devices 140 and turn on and off the lighting loads 122 in response to an occupied signal and a vacant signal, respectively. The sensors devices 140 may operate as vacancy sensors, such that the lighting loads may be manually turned on by a user and/or automatically turned off in response to detecting a vacancy signal from the sensor devices 140 (e.g., the lighting load is not turned on in response to detecting an occupancy condition). Examples of load control systems having occupancy and vacancy sensors are described in greater detail in commonly-assigned U.S. Pat. No. 8,228,184, issued Jul. 24, 2012, entitled BATTERY-POWERED OCCUPANCY SENSOR, U.S. Pat. No. 8,009,042, issued Aug. 30, 2011 Sep. 3, 2008, entitled RADIO-FREQUENCY LIGHTING CONTROL SYSTEM WITH OCCUPANCY SENSING, and U.S. Pat. No. 8,199,010, issued Jun. 12, 2012, entitled METHOD AND APPARATUS FOR CONFIGURING A WIRELESS SENSOR, the entire disclosures of which are hereby incorporated by reference.

The sensor devices 140 may operate as visible light sensors (e.g., including a camera or other device capable of sensing visible light). The sensor devices 140 may be capable of performing the sensor measurement event by measuring an amount of visible light within the load control environment 102. For example, the sensor devices 140 may comprise a visible light sensing circuit having an image recording circuit, such as a camera, and an image processing circuit. The image processing circuit may comprise a digital signal processor (DSP), a microprocessor, a programmable logic device (PLD), a microcontroller, an application specific integrated circuit (ASIC), a field-programmable gate array (FPGA), or any suitable processing device capable of processing images or levels of visible light. The sensor devices 140 may be positioned towards the load control environment 102 to sense one or more environmental characteristics in the load control environment 102. The image recording circuit of the sensor devices 140 may be configured to capture or record an image. The image recording circuit of the sensor devices 140 may provide the captured image to the image processor. The image processor may be configured to process the image into one or more output signals that are representative of the sensed environmental characteristics. For example, the one or more output signals may include signals measured by the image recording circuit and/or image processor, or messages that correspond to the signals measured by the image recording circuit and/or image processor. The sensed environmental characteristics may be interpreted from the output signals by the control circuit of the sensor device 140 and/or the output signals may be transmitted to one or more other devices via a wireless communication link (e.g., a computing device in the load control environment) and/or a wired communication link (e.g., a computing device within the linear lighting fixture 126) for interpreting the sensed environmental characteristics. For example, the sensed environmental characteristics interpreted from the output signals may comprise an occurrence of movement, an amount of movement, a direction of movement, a velocity of movement, a counted number of occupants, an occupancy condition, a vacancy condition, a light intensity, a color of visible light, a color temperature of visible light, an amount of direct sunlight penetration, or another environmental characteristic in the load control environment 102. In another example, the sensor devices 140 may provide a raw image or a processed (e.g., preprocessed) image to one or more other devices (e.g., computing devices) in the load control system 100 for further processing. The sensor devices 140 may operate as a color temperature sensor when sensing the color temperature of the visible light. Examples of load control systems having visible light sensors are described in greater detail in commonly-assigned U.S. Pat. No. 10,264,651, issued Apr. 16, 2019, entitled LOAD CONTROL SYSTEM HAVING A VISIBLE LIGHT SENSOR, and U.S. Patent App. Pub. No. 2018/0167547, published Jun. 14, 2018, entitled CONFIGURATION OF A VISIBLE LIGHT SENSOR, the entire disclosures of which are hereby incorporated by reference. In addition, the sensor devices 140 may operate as optical sensors, temperature sensors, humidity sensors, smoke detectors, carbon monoxide detectors, air-quality sensors, motion sensors, security sensors, proximity sensors, and/or any other type of sensors.

The sensor devices 140 may be positioned towards the load control environment 102 and may be capable of (e.g., configured to) performing sensor measurement events in the load control environment 102. The sensor devices 140 may be mounted to a corresponding linear lighting fixture 126 (e.g., on a lower or outward-facing surface of the lighting fixture 126). For example, one or more sensor devices 140 may be electrically coupled to a control circuit or a load control circuit of the load control devices 124 for performing control in response to the sensor measurement events of the sensor devices 140. Each sensor device 140 may be attachable and/or detachable to the linear lighting fixture 126. Attaching a sensor device 140 may comprise electrically coupling the sensor device 140 to a wired power/communication link 120, and/or mechanically connecting the sensor device 140 to the linear lighting fixture 126. The sensor devices 140 may be coupled to the wired power/communication link 120, and/or mechanically connected to the linear lighting fixture 126 via a port (e.g., a hole) in an enclosure of the linear lighting fixture 126.

Figure 2A:
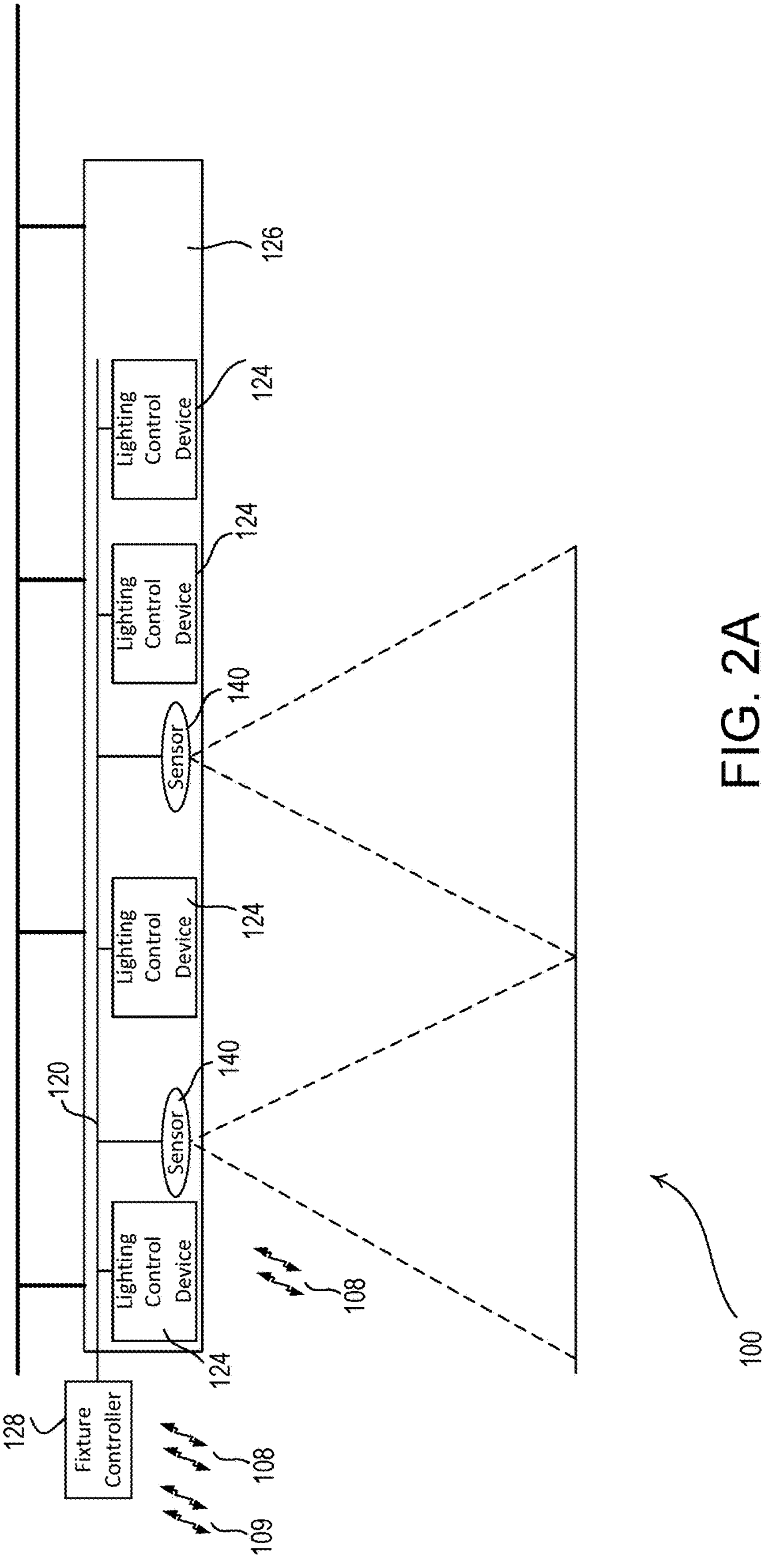
FIG. 2A is a diagram showing a side view schematic of an example linear lighting fixture.

The lighting control devices 124, lighting loads 122, and/or sensor devices 140 may be installed in a linear lighting fixture, such as the linear lighting fixtures 126. The diagram of the example load control system 100 in FIG. 1 shows a perspective view of linear lighting fixtures 126 installed in the load control system 100. FIG. 2A shows a side view schematic of the example linear lighting fixtures 126 installed in the load control system 100. As shown in FIG. 1 and FIG. 2A, each linear lighting fixture 126 may comprise one or more lighting control devices 124 for controlling respective lighting loads 122 (not shown in FIG. 2A) in linear lighting fixture 126. While each lighting fixture 126 is shown having multiple lighting loads 122, each lighting fixture 126 may comprise one or more individual light sources (e.g., lamps and/or LED light sources).

The lighting control devices 124 in each linear lighting fixture 126 may be grouped together in zones (e.g., such that the lighting control devices 124 in a single zone may be controlled together). For example, all of the lighting control devices 124 in one of the linear lighting fixtures 126 may be grouped together in a single zone, such that the lighting control devices 124 for each linear lighting fixture 126 may be controlled together. In addition, subsets of the lighting control devices 124 in one of the linear lighting fixtures 126 may be grouped together into overlapping and/or non-overlapping zones. Further, each of the lighting control devices 124 in one of the linear lighting fixtures 126 may be included in a different zone, such that the lighting control devices 124 for the linear lighting control fixture 126 may be controlled separately. Each lighting control device 124 may be assigned a zone identifier corresponding to the zone within the lighting control device that is to be controlled. Thus, each lighting control device 124 in each linear lighting fixture may be assigned to a different zone or the same zone as one or more other lighting control devices 124 in the linear lighting fixture 126 for being controlled separately or together, respectively.

Some lighting fixtures may include a separate controller or a separate wireless communication circuit (e.g., RF communication circuit) for each lighting control device 124. Such lighting fixtures may transmit RF signals in the space in which the load control system 100 is installed for each lighting control device 124, which may cause a relatively high amount of RF traffic in the space. Additionally, such lighting fixtures may implement processing on separate controllers, which may be uncoordinated or duplicative. Further, when one sensor is configured to control a single corresponding lighting control device, the location at which the sensor is located may be limited, which may result in an increased number of sensors in the space communicating on the network or a decreased number of sensors resulting in a lack of sensor control.

As shown in FIG. 1 and FIG. 2A, each linear lighting fixture 126 may comprise a fixture controller 128 configured to control multiple lighting control devices 124 in the linear lighting fixture. The fixture controller 128 may comprise a control circuit configured to control the lighting control devices 124 in response to messages and/or commands received via the RF signals 108. The fixture controller 128 may receive commands for configuring and/or controlling one or more lighting control devices 124 in the linear lighting fixture 126 and communicate commands to the lighting control devices 124 for enabling such control. The fixture controller 128 may comprise one or more wired communication circuits for transmitting and/or receiving signals and/or messages via respective wired communication links. For example, the fixture controller 128 may transmit and/or receive messages via the wired communication circuit on a wired power/communication link 120 in the linear lighting fixture 126. For example, the wired power/communication link 120 may be used by the fixture controller 128 to transmit messages (e.g., including commands) to the lighting control devices 124 for controlling the intensity level and/or color of the respective lighting loads 122. The fixture controller 128 may receive messages (e.g., including feedback information) from the lighting control devices 124 that indicate the intensity level and/or color of the respective lighting loads 122. In an example, the wired power/communication link 120 may comprise, for example, a Digital Addressable Lighting Interface (DALI) link or another digital communication link.

The wired power/communication link 120 may be used for providing communications and/or power within the linear lighting fixture 126. For example, the lighting control devices 124 may receive power from an AC power source (not shown). One or more of the lighting control devices may supply power to the fixture controller 128 via the wired power/communication link 120. In addition, the lighting control devices 124 may control the power delivered to the lighting loads 122 (e.g., the power to a single lighting load 122 and/or to multiple lighting loads 122) to control the lighting intensity and/or color of the light emitted by the lighting loads 122 (e.g., via separate electrical wiring—not shown). Though the wired power/communication link 120 may be shown as a single link, the wired power/communication link may be comprised of multiple links. For example, one or more of the lighting control devices 124 may provide power to the fixture controller 128 via a two-wire power bus, while communications may be performed between the fixture controller 128 and the lighting control devices 124 using an analog communication link, such as a 0-10V control link or another communication link through which power may not be provided.

When the sensor devices 140 are coupled to the wired power/communication link 120, the sensor devices 140 may, for example, receive power and/or transmit and/or receive messages on the wired power/communication link 120. As described herein the wired power/communication link 120 may comprise one or more links for providing communication and/or power within the linear lighting fixture 126. The sensor devices 140 may also be included on the wired power/communication link 120 (e.g., same link as the fixture controller 128) for receiving power from a lighting control device 124 in the linear lighting fixture 126. The sensor devices 140 may be battery powered instead. The sensor devices 140 may transmit and/or receive messages from the fixture controller 128 on the same link or a different link than the lighting control devices 124. For example, the lighting control devices 124 may communicate with the fixture controller 128 on a 0-10V control link or other communication analog link, while the sensor devices 140 may communicate with the fixture controller 128 on a DALI link or other digital communication link. The lighting control devices 124 and the sensor devices 140 may alternatively communicate on the same or different digital communication links.

The sensor devices 140 may comprise a wireless communication circuit capable of communicating with the fixture controller 128 and/or other devices in the load control system 100 via RF signals 108. The sensor devices 140 may communicate messages to the fixture controller 128 for communicating with other devices in the load control system 100 or for controlling the lighting loads 122 locally on the linear lighting fixture 126. For example, in the example in which the sensor devices 140 are occupancy sensors, the sensor devices 140 may communicate messages that include occupancy and/or vacancy conditions to the fixture controller 128 for controlling the lighting control devices 124 in response to the occupancy and/or vacancy conditions (e.g., turning the lighting loads 122 on or off in response to occupancy and vacancy conditions, respectively). In the example in which the sensor devices 140 are daylight sensors, the sensor devices 140 may communicate messages that include a measured daylight intensity level to the fixture controller 128 for controlling the lighting control devices 124 in response to the measured daylight intensity level (e.g., adjusting the intensity and/or color of the lighting loads 122 in response to the measured daylight intensity level). The sensor devices 140 and/or the fixture controller 128 of one linear lighting fixture 126 may communicate via the RF signals 108 with the sensors and/or fixture controller 128 of another linear lighting fixture 126.

Each of the sensor devices 140 in a linear lighting fixture 126 may be grouped with one or more of the zones of the lighting control devices 124 in the linear lighting fixture 126. For example, each of the sensor devices 140 in a linear lighting fixture 126 may be grouped with all of the zones in the linear lighting fixture 126 for controlling all of the lighting control devices 124 in the linear lighting fixture 126 together. In addition, each of the sensor devices 140 in the linear lighting fixture 126 may be grouped with one or more of the zones of the lighting control devices 124 that comprise a subset of the lighting control devices 124 in the linear lighting fixture. The zones of linear lighting fixtures 126 that are controlled by each sensor device 140 may be stored in memory (e.g., zone identifiers stored with sensor identifiers) at the fixture controller 128 for performing control in response to messages received from the sensor devices 140. The number of sensor devices 140 in each linear lighting fixture 126 may be configurable. The zones of lighting control devices 124 that are controlled by each sensor device 140 in the linear lighting fixture may be configurable. In another example, the number of sensor devices 140 in each linear lighting fixture 126 may be preconfigured and the zones of lighting control devices 124 may be preconfigured in the memory of the fixture controller 128, such that the linear lighting fixtures 126 may be able to be installed and perform control out of the box. The wired and/or wireless communication of the sensor devices 140, the lighting control devices 124, and/or the fixture controller 128 may be preconfigured to enable the out-of-the-box functionality. In an example, each sensor device 140 may be grouped to control a corresponding zone including a single lighting control device 124 or a zone including a predefined number of lighting control devices 124 within its proximity (e.g., one or more lighting control devices 124 on either side of the sensor device 140). For example, the lighting control devices 124 within the proximity of a sensor device 140 may correspond to an area the sensor is configured to sense information in.

The fixture controller 128 may comprise a memory or other computer-readable storage medium capable of storing instructions thereon for being executed by a control circuit of the fixture controller 128. The fixture controller 128 may store in the memory unique identifiers of other devices in the load control system 100 with which the fixture controller 128 is associated to enable recognition of messages from and/or transmission of messages to associated devices. For example, the memory may store the unique identifier of the remote control device 170 and/or sensors (e.g., sensor devices 140) with which the fixture controller 128 and/or the lighting control devices 124 are associated. The memory of the fixture controller 128 may have stored thereon one or more zone identifiers that may be used to determine how to control one or more of the lighting control devices 124 in response to received messages and/or instructions. Each zone identifier may correspond to one or more lighting control devices 124 that may be controlled in response to control instructions for controlling the zone. For example, in response to an actuation of a first button on the remote control device 170, the fixture controller 128 may identify a first zone of lighting control devices 124 for being controlled and, in response to an actuation of a second button on the remote control device 170, the fixture controller 128 may identify a second zone of lighting control devices 124 for being controlled.

The fixture controller 128 may comprise one or more wireless communication circuits for transmitting and/or receiving messages, e.g., via the RF signals 108, 109 (which is discussed further below). The RF signals 109 may be the same signal type and/or transmitted using the same protocol as the RF signals 108. Alternatively, or additionally, the RF signals 109 may be transmitted according to another signal type and/or protocol as the RF signals 108. A first wireless communication circuit in the fixture controller 128 may be capable of (e.g., configured to) communicating on a first wireless communication link (e.g., a wireless network communication link) and/or communicating using a first wireless protocol (e.g., a wireless network communication protocol, such as the CLEAR CONNECT and/or THREAD protocols), e.g., via the RF signals 108. A second wireless communication circuit in the fixture controller 128 may be capable of communicating on a second wireless communication link (e.g., a short-range wireless communication link) and/or communicating using a second wireless protocol (e.g., a short-range wireless communication protocol, such as the BLUETOOTH and/or BLUETOOTH LOW ENERGY (BLE) protocols), e.g., via the RF signals 109.

The fixture controller 128 may be configured to receive messages via RF signals 108, 109 and control the lighting loads 122 via the lighting control devices 124 in response to the received messages via wireless or wired communications. For the fixture controller 128 to recognize messages directed to the lighting control devices 124 in the lighting fixtures 126 and/or to which to be responsive, the lighting control devices 124 and/or the fixture controller 128 may be associated with the input devices from which messages may be received by performing an association procedure. For example, for the fixture controller 128 to be responsive to messages from an input device (e.g., remote control device 170), the input device may first be associated with the fixture controller 128 and/or the lighting control devices 124 for being controlled. As one example of an association procedure, devices may be put in an association mode for sharing a unique identifier for being associated with and/or stored at other devices in the load control system 100. For example, an input device and the fixture controller 128 may be put in an association mode by the user 192 actuating a button on the input device and/or the fixture controller 128. The actuation of the button on the input device and/or the fixture controller 128 may place the input device and/or the fixture controller 128 in the association mode for being associated with one another. In the association mode, the input device may transmit an association message(s) to the fixture controller 128 (directly or through one or more other devices as described herein). The association message from the input device may include a unique identifier of the input device. The fixture controller 128 may locally store the unique identifier of the input device in association information, such that the fixture controller 128 may be capable of (e.g., configured to) recognizing messages (e.g., subsequent messages) from the input device that may include load control instructions or commands. The association information stored at the fixture controller 128 may include the unique identifiers of the devices with which the fixture controller 128 and/or the lighting control devices 124 in the linear lighting fixture 126 are associated. The fixture controller 128 may be configured to respond to the messages from the associated input device by transmitting a message to the lighting control devices 124 for controlling a corresponding electrical load according to the load control instructions received in the messages. The input device may also store the unique identifier of the fixture controller 128 and/or the load control devices 124 with which it is being associated in association information stored locally thereon. A similar association procedure may be performed between other devices in the load control system 100 to enable each device to perform communication of messages with associated devices. This is merely one example of how devices may communicate and be associated with one another and other examples are possible.

According to another example, one or more devices may receive system configuration data (e.g., or subsequent updates to the system configuration data) that is uploaded to the devices and that specifies the association information comprising the unique identifiers of the devices for being associated. The system configuration data may comprise a load control dataset that defines the devices and operational settings of the load control system 100. The system configuration data may include information about the devices in the user environment 102 and/or the load control system 100. The system configuration data may include scenes for controlling the intensity level, color temperature, and/or color of the lighting loads in response to certain input. The system configuration data may include defined zones that include a zone identifier for one or more lighting control devices and/or lighting loads in a linear lighting fixture. The system configuration data may include lighting intensities, color temperatures, and/or colors to which to control one or more zones of lighting control devices in response to defined input. The system configuration data may include associations of devices in the load control system. For example, the configuration data may include associations of sensor devices and lighting control devices within the linear lighting fixture. The configuration data may include associations of other input devices (e.g., remote control device 170) in the load control system with the lighting control devices or zones of lighting control devices in a linear lighting fixture. The configuration data may include timing schedules at which one or more zones of lighting control devices within a linear lighting fixture may be controlled to an intensity, color temperature, or color.

The system configuration data may include association information that indicates defined associations between devices in the load control system 100. The association information may comprise device identifiers that are stored together, such that devices may recognize the identifiers of associated devices to enable communication between the devices. The association information may associate different devices in the load control system 100 (e.g., remote control device 170 being associated with the fixture controller 128 and/or one or more lighting control devices 124 of one of the linear lighting fixtures 126) and/or different components of the linear lighting fixtures (e.g., one of the sensor devices 140 being associated with one or more of the lighting control devices 124 within a linear lighting fixture 126). The association information may be updated using any of the association procedures described herein.

One or more intermediary devices may also maintain association information that includes the unique identifiers that make up the associations of other devices in the load control system 100. For example, the input devices and the fixture controller 128 may communicate on a communication link in the load control system 100 through one or more other intermediary devices. The intermediary devices may comprise input devices, load control devices, a central processing device, or another intermediary device capable of enabling communication between devices in the load control system. The association information that is maintained on the intermediary devices may comprise the unique identifiers of the devices that are associated with one another for identifying and/or enabling communication of messages between devices in the load control system 100. For example, an intermediary device may identify the unique identifiers being transmitted in association messages between devices during the association procedure and store the unique identifiers of the devices as an association in the association information. The intermediary devices may use the association information for monitoring and/or routing communications on a communication link between devices in the load control system 100. In another example, the association information of other devices may be uploaded to the intermediary device and/or communicated from the intermediary device to the other devices for being locally stored thereon (e.g., at the input devices and/or load control devices).

The load control system 100 may comprise a system controller 110. The system controller 100 may operate as an intermediary device, as described herein. For example, the system controller 110 may operate as a central processing device for one or more other devices in the load control system 100. The system controller 110 may operable to communicate messages to and from the control devices (e.g., the input devices and the load control devices). For example, the system controller 110 may be configured to receive messages from the input devices (e.g., remote control device 170) and transmit messages to the fixture controllers 128 and/or the lighting control devices 124 in the linear lighting fixtures 126 in response to the messages received from the input devices. The system controller 110 may route the messages based on the association information stored thereon. The system controller 110 may receive messages from the sensor devices 140 (e.g., via the fixture controller 128) and communicate the messages to other devices in the load control system (e.g., via the fixture controller 128). The messages from the sensor devices 140 may be communicated via RF signals 108 or the wired power/communication link 120 with the fixture controller 128 for communicating messages to the system controller 110. Similarly, the fixture controller 128 may receive status messages from the lighting control devices 124 for communicating the status of the lighting loads 122 to the system controller 110. The system controller 110 may use the information from the sensor devices 140 and/or the status of the lighting loads 122 to perform control of the lighting loads 122 in the load control system 100. For example, the system controller 110 may receive message indicating an actuation of a button from the remote control device 170, and send a message to the fixture controller 128 for controlling the electrical loads 122. Though the system controller 110 is described as communicating messages between devices in the load control system 100, messages may be communicated directly between devices.

The system controller 110 may be coupled to a network, such as a wireless or wired local area network (LAN), e.g., for access to the Internet. The system controller 110 may be wirelessly connected to the network, e.g., using WIFI technology. The system controller 110 may be coupled to the network via a network communication bus (e.g., an Ethernet communication link) The system controller 110 may be configured to communicate via the network with one or more network devices, e.g., a mobile device 190, such as, a personal computing device and/or a wearable wireless device. The mobile device 190 may be located on a user 192, for example, may be attached to the occupant's body or clothing or may be held by the occupant. The mobile device 190 may be characterized by a unique identifier (e.g., a serial number or address stored in memory) that uniquely identifies the mobile device 190 and thus the user 192. Examples of personal computing devices may include a smart phone, a laptop, and/or a tablet device. Examples of wearable wireless devices may include an activity tracking device, a smart watch, smart clothing, and/or smart glasses. In addition, the system controller 110 may be configured to communicate via the network with one or more other control systems (e.g., a building management system, a security system, etc.).

The system controller 110 may be configured to communicate via the network with one or more computing devices, e.g., a mobile device 190, such as, a personal computing device and/or a wearable wireless device. The mobile device 190 may operate as an input device for configuring and/or controlling the lighting control devices 124 in the linear lighting fixtures 126. The mobile device 190 may be located on an occupant 192, for example, may be attached to the occupant's body or clothing or may be held by the occupant. The mobile device 190 may be characterized by a unique identifier (e.g., a serial number or address stored in memory) that uniquely identifies the mobile device 190 and thus the occupant 192. Examples of personal computing devices may include a smart phone, a laptop, and/or a tablet device. Examples of wearable wireless devices may include an activity tracking device, a smart watch, smart clothing, and/or smart glasses. In addition, the system controller 110 may be configured to communicate via the network with one or more other control systems (e.g., a building management system, a security system, etc.).

The mobile device 190 may be configured to transmit messages to the system controller 110, for example, in one or more Internet Protocol packets. For example, the mobile device 190 may be configured to transmit messages to the system controller 110 over the LAN and/or via the Internet. The mobile device 190 may be configured to transmit messages over the Internet to an external service, and then the messages may be received by the system controller 110. The mobile device 190 may transmit and receive RF signals 109. The RF signals 109 may be the same signal type and/or transmitted using the same protocol as the RF signals 108. Alternatively, or additionally, the mobile device 190 may be configured to transmit RF signals 109 according to another signal type and/or protocol. The load control system 100 may comprise other types of computing devices coupled to the network, such as a desktop personal computer (PC), a wireless-communication-capable television, or any other suitable Internet-Protocol-enabled device. Examples of load control systems operable to communicate with mobile and/or computing devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The operation of the load control system 100 may be programmed and configured using, for example, the mobile device 190 or other computing device (e.g., when the mobile device is a personal computing device). The mobile device 190 may execute a graphical user interface (GUI) configuration software for allowing a user 192 to program how the load control system 100 will operate. For example, the configuration software may run as a PC application or a web interface. The configuration software may receive input from the user 192 on the mobile device 190 for configuring the zones of lighting control devices 124 within each linear lighting fixture 126 and the lighting control instructions that indicate a lighting intensity level, a color temperature, a color, or another lighting control parameter to which to control the zone of lighting control devices in response to input received from an input device in the load control system 100. The configuration software and/or the system controller 110 (e.g., via instructions from the configuration software) may generate the system configuration data that may include the load control dataset that defines the operation of the load control system 100. For example, the load control dataset may include information regarding the operational settings of different load control devices (e.g., the lighting control devices 124) of the load control system. The load control dataset may comprise information regarding how the lighting control devices 124 respond to inputs received from the input devices. The load control dataset may comprise zone identifiers that identify one or more zones in which the lighting control devices 124 and/or lighting loads 122 are programmed for performing control in response to messages from input devices. The load control dataset may be stored on the system controller 110 and/or the fixture controllers 128 for interpreting the control instructions to be sent to the lighting control devices 124 for performing lighting control in response to the received input. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2014, entitled COMMISSIONING LOAD CONTROL SYSTEMS.

The user 192 may use the mobile device 190 to commission components (e.g., the lighting control devices 124, the sensor devices 140, and/or the fixture controllers 128) and/or segments of the linear lighting fixture 126. The user 192 may alternatively or additionally perform commissioning via the remote control device 170 and/or inputs (e.g., buttons, knobs, and/or the like) on the linear lighting fixture 126 itself. Commissioning may be performed to generate system configuration data used to control of a component, a zone, and/or segment of the linear lighting fixture 126. The load control dataset in the system configuration data may comprise information regarding how the fixture controller 128 and/or the load control devices 124 respond to messages received from the input devices. The system configuration data may include one or more zones in the lighting control system 100 for controlling the lighting control devices 124 of the linear lighting fixtures 126. The zones may include each of the lighting control devices 124 in a given linear lighting fixture 126, or a subset thereof. Examples of configuration procedures for load control systems are described in greater detail in commonly-assigned U.S. Pat. No. 7,391, 297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2014, entitled COMMISSIONING LOAD CONTROL SYSTEMS, the entire disclosure of which is hereby incorporated by reference.

The mobile device 190 may communicate messages that include control instructions (e.g., commands) for controlling one or more lighting control devices 124. The messages may include the unique identifier of the lighting control devices for being controlled, the identifier of the linear lighting fixture or fixture controller, a scene identifier, a zone identifier or another group identifier. The mobile device 190 may be configured to transmit messages to the system controller 110, for example, in one or more Internet Protocol packets. For example, the mobile device 190 may be configured to transmit messages to the system controller 110 over the LAN and/or via the Internet. The system controller 110 may receive messages from the mobile device 190 and transmit messages to the fixture controller 128 of linear lighting fixture 126 for enabling control of the load control devices in the load control system 100. For example, the system controller 110 may send control instructions to the fixture controller 128 of the linear lighting fixture 126 in response to zone configurations and/or selections at the mobile device 190 to adjust the intensity level and/or color of the lighting loads 122. The mobile device 190 may communicate messages to the system controller 110 via RF signals 109 and the system controller 110 may communicate messages to the fixture controller 128 of the linear lighting fixtures 126 via the RF signals 108. In another example, the mobile device 190 may communicate the messages directly to the fixture controllers 128.

Figure 2B:
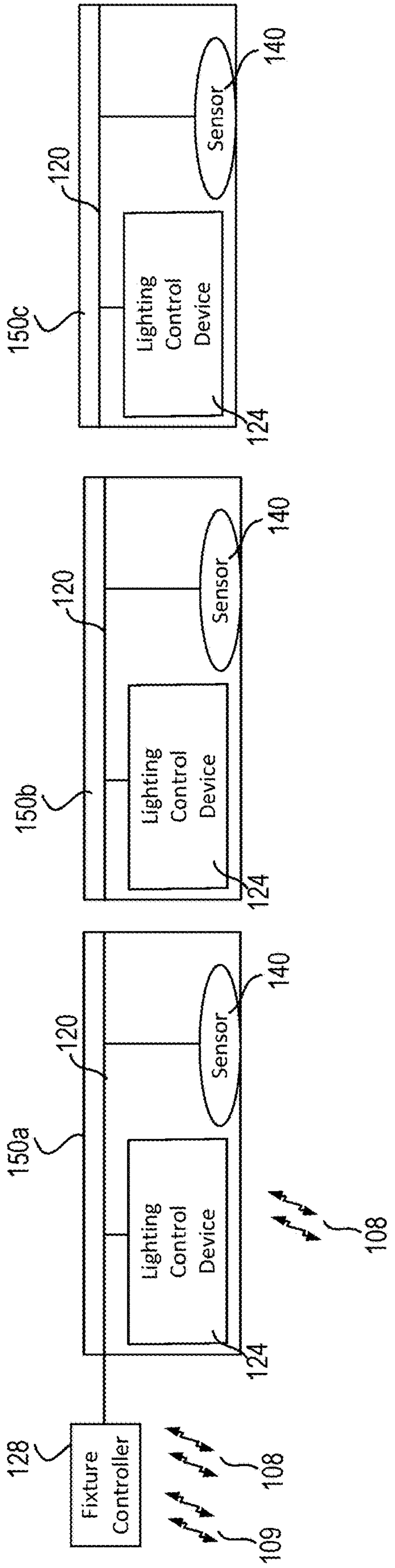
FIG. 2B is a diagram showing a side view schematic of the example linear lighting fixture of FIG. 2A in a segmented form.

The linear lighting fixture 126 may comprise one or more segments for being attached to each other before being installed in the lighting control system 100. For example, the linear lighting fixture 126 may be broken up into segments in order to ship long linear lighting fixtures 126 to the location of installation, and they may be subsequently installed as the linear lighting fixture 126. FIG. 2B shows a side view schematic of the linear lighting fixture 126 in a segmented form. For example, the linear lighting fixture 126 may comprise multiple segments, such as segments 150*a*, 150*b*, 150*c*. As shown in FIG. 2B, each of the segments 150*a*, 150*b*, 150*c* may include one or more lighting control devices 124, lighting loads, and/or sensor 140. Though FIG. 2B illustrates a linear lighting fixture 126 comprising three segments, the linear lighting fixture 126 may comprise more or less segments. The segments 150*a*, 150*b*, 150*c* may be preconfigured to be attached to form the linear lighting fixture 126, for example to build a preconfigured linear lighting fixture 126 by attaching to one or more of the other segments 150*a*, 150*b*, 150*c*. Each segment 150*a*, 150*b*, 150*c* may be attachable to and/or detachable from another segment 150*a*, 150*b*, 150*c*.

Attaching the segments 150*a*, 150*b*, 150*c* may enable mechanical, electrical, and/or communicative coupling of the segments 150*a*, 150*b*, 150*c* of the linear lighting fixture 126. For example, once the segment 150*a* is attached (e.g., affixed) to the segment 150*b*, the wired power/communication link 120 may enable the electrical and/or communicative coupling. Similarly, once the segment 150*b* is attached (e.g., affixed) to the segment 150*c*, the wired power/communication link 120 may enable the electrical and/or communicative coupling. One or more of the lighting control devices 124 may receive power from an AC power source that may be used to provide power to the fixture controller 128 and/or the sensor devices 140. For example, each of the lighting control devices 124 may receive power from an AC power source and provide power to the sensor devices 140 in their respective segments 150*a*, 150*b*, 150*c* via the wired power/communication link 120. The lighting control device 124 in the segment 150*a* may provide power to the fixture controller 128. In another example, a single lighting control device 124 may receive power from an AC power source and provide power to the other segments. For example, the lighting control device 124 of the segment 150*a* may receive power from an AC power source and provide power to the fixture controller 128 and the sensor device 140 via the wired power/communication link 120. The segment 150*b* may be electrically coupled to the segment 150*a*, such that power may be provided to the lighting control device 124 and/or the sensor device 140 of the segment 150*b* via the wired power/communication link 120 (e.g., from the segment 150*a*). Similarly, the segment 150*c* may be electrically coupled to the segment 150*b*, such that power may be provided to the lighting control device 124 and/or the sensor device 140 of the segment 150*c* via the wired power/communication link 120.

As shown in FIG. 2B, the segment 150*a* may comprise the fixture controller 128 and may be attached to the segment 150*b* of the lighting fixture 126. The segment 150*a* that comprises the fixture controller 128 may include one or more lighting control devices 124 and corresponding lighting loads 122 (not shown in FIG. 2B). Attaching the segment 150*a* to the segment 150*b* may enable communication of messages on the wired power/communication link 120 between the fixture controller 128 and the lighting control device 124 and/or the sensor device 140 installed in the segment 150*b*. Similarly, after the segment 150*b* has been attached to the segment 150*a*, attaching the segment 150*b* to the segment 150*c* may enable communication of messages on the wired power/communication link 120 between the fixture controller 128 and the lighting control device 124 and/or the sensor device 140 installed in the segment 150*c*. As described herein, the power/communication link 120 may comprise multiple links, such that the link between the fixture controller 120 and the lighting control devices 124 may be separate from the link between the fixture controller 120 and the sensor devices 140. Additionally, the link (e.g., the power bus) on which power is provided from one of the lighting control devices 124 to the fixture controller 128 may be separate from the communication link (e.g., the 0-10V control link) on which communications may be transmitted.

When subsequent segments are attached, the wired power/communication link 120 may be attached to couple the segments electrically to one another and to the fixture controller 128. Each subsequent segment may have the same configuration. For example, each segment may have a lighting control device 124 and a sensor device 140 (or a port for installing a sensor), as shown in FIG. 2B. In another example, each subsequent segment may have a different configuration. For example, different segments may have different numbers of lighting control devices 124 and/or sensor devices 140 (or ports for installing sensors). Different types of sensor devices 140 may be installed in different segments for enabling different functionality.

Figure 2C:
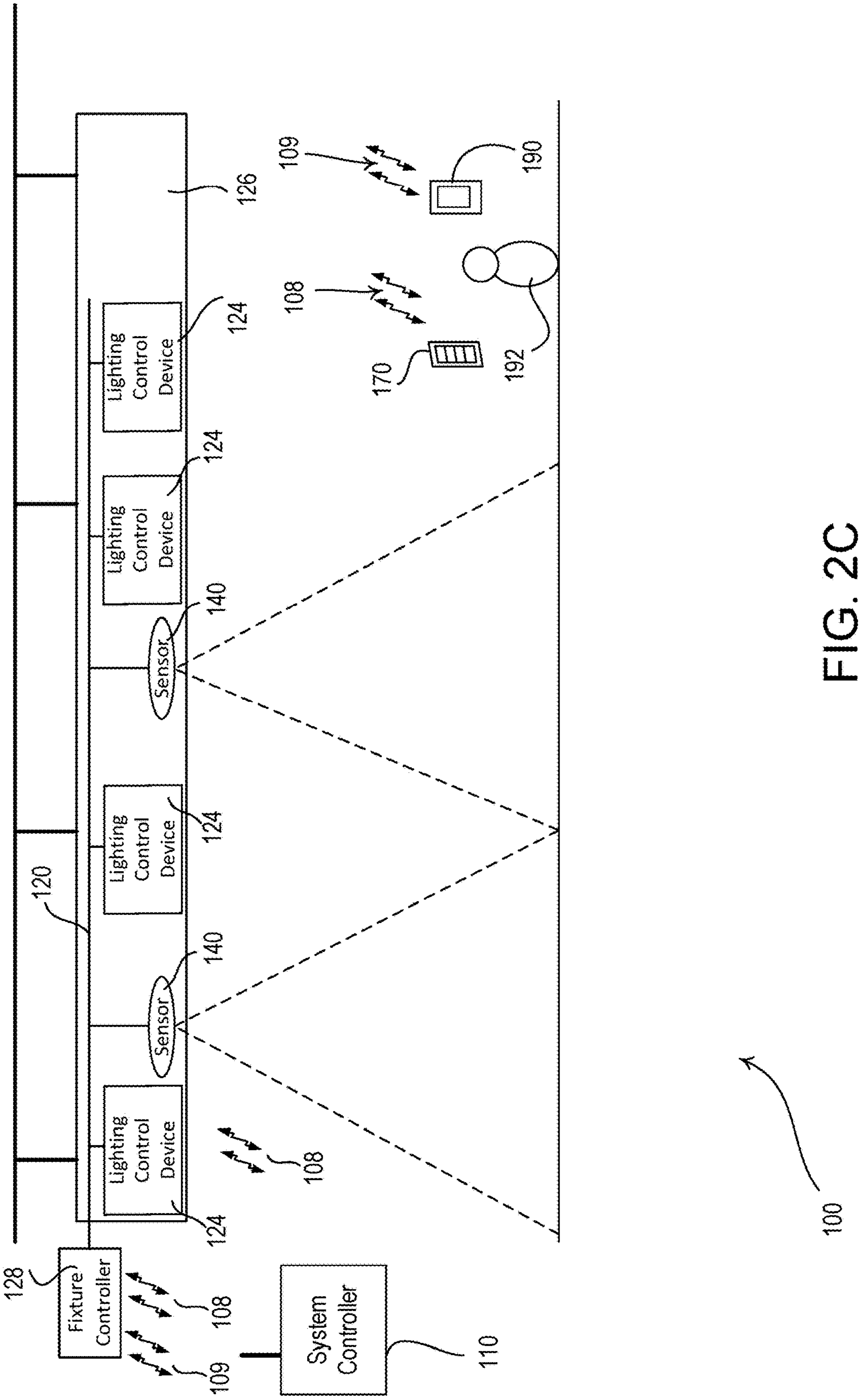
FIG. 2C is a diagram showing a side view schematic of the linear lighting fixtures installed in the load control system of FIG. 1 and example control devices therein that may be used to commission the linear lighting fixtures.

FIG. 2C shows a side view schematic of the linear lighting fixtures 126 installed in the load control system 100 and example control devices therein that may be used to commission the linear lighting fixtures 126. As shown in FIG.

2C, each linear lighting fixture 126 may be commissioned in response to an input received at the remote control device 170 and/or the mobile device 190. For example, the user 192 may use the mobile device 190 to commission components (e.g., the lighting control devices 124, the sensor devices 140, and/or the fixture controller 128) of the linear lighting fixtures 126. The commissioning may result in generation of system configuration data that may be stored at the mobile device 190, the system controller 110, and/or the fixture controller 128.

The mobile device 190 may be capable of commissioning the linear lighting fixtures 126 using RF signals 109. The RF signals 109 may be transmitted using short-range communication protocol, such as the BLUETOOTH or BLUETOOTH LOW ENERGY (BLE) protocols, for example. The mobile device 190 may communicate directly with the fixture controller 128 via the RF signals 109 in response to the user input to configure the linear lighting fixtures 126 during commissioning.

The user 192 may provide input to the remote control device 170 and/or the mobile device 190 to generate the system configuration data for being stored at the system controller 110 and/or the fixture controllers 128 for controlling the linear lighting fixtures 126. The user 192 may input system configuration data (e.g., scenes, zones, lighting intensities to which to control lighting loads, color temperatures to which to control lighting loads, colors to which to control lighting loads, associations, timing schedules, etc.) and transmit the system configuration data to the system controller 110 or directly to the fixture controller 128 via the RF signals 109. In another example, the user may be instructed by the mobile device 190 on buttons to press on the remote control device 170 for communicating system configuration data to the fixture controllers 128 via the RF signals 108. The user 192 may provide input to the remote control device 170 and/or the mobile device 190 to establish the zones and/or groups for controlling the lighting control devices 124. For example, the user 192 may select the lighting control devices 124 and/or sensor devices 140 within each linear lighting fixture 126 to be grouped together in the same zone or group. The user 192 may select other input devices (e.g., remote control device 170) to be included in each zone or group for enabling control of the lighting control devices 124 in the zone or group.

During setup and installation of the linear lighting fixtures 126, the segments of the linear lighting fixtures 126 may be attached in a predefined order or location within the linear lighting fixture to enable a preconfigured operation out of the box. For example, the preconfigured operations may include predefined zones, associations, and/or scenes for the lighting control devices 124 and/or sensor devices 140 in the linear lighting fixture 126. To ensure that the segments of the linear lighting fixtures 126 have been properly attached, the user 192 may implement the mobile device 190 and/or the remote control device 170 to perform a verification procedure during commissioning to verify the proper attachment of the segments of the linear lighting fixtures 126. The verification procedure may ensure proper setup and installation for the preconfigured operation.

In one example, the user 192 may initiate the verification procedure by selection of one or more buttons on the remote control device 170 or the mobile device 190. A verification triggering message may be transmitted by the remote control device 170 or the mobile device 190 and received by at least one of the fixture controllers 128. In response to the verification triggering message, the fixture controller 128 may send a verification message to a designated verification device in each of the segments. The designated verification device may be the lighting control device 124 or the sensor device 140 in a given segment. The designated verification device may store in memory an indicator that the device is the designated verification device, such that the designated verification device knows to respond to the verification message. The verification message may be sent to the designated verification device via a wired communication link (e.g., via the wired power/communication link 120) or via a wireless communication link (e.g., the RF signals 108). In one example, each segment of the linear lighting fixture 126 may comprise a sensor device 140 that may receive the verification message and respond with a message that includes the unique identifier of the sensor device 140. Though the unique identifier of the device may be used, the designated verification device may have stored in memory a different verification identifier that may indicate a location in the linear lighting fixture 126 at which the segment is to be installed.

If the designated verification devices (e.g., sensor devices 140) can communicate via RF signals, the fixture controller 128 may receive verification response messages from each of the designated verification devices (e.g., sensor devices 140) and record a communication quality metric (e.g., a signal strength identifier, such as a received signal strength indicator (RSSI) value) at which each of the verification response messages are received from the designated verification devices (e.g., sensor devices 140). From the measured communication quality metric (e.g., RSSI values) of each verification message and the verification identifier of the designated verification device (e.g., sensor devices 140) from which the verification message is received, the fixture controller 128 may determine the relative distance of each of the designated verification devices (e.g., sensor devices 140) from the fixture controller 128, and thus the relative distance of the corresponding segments in which the designated verification devices (e.g., sensor devices 140) are installed. The fixture controller 128 may use measured communication quality metric (e.g., RSSI values) to determine the order in which the segments are installed. For example, the fixture controller 128 may have prestored thereon the order in which the segments and/or the designated verification devices (e.g., sensor devices 140) within the segments should be installed. In another example, the order may be inferred from the verification identifiers of the designated verification devices (e.g., sensor devices 140) themselves that are installed in each segment (e.g., closest sensor has identifier of "1", next sensor has identifier of "2", etc.). If the segments are determined by the fixture controller 128 to be out of order, the fixture controller 128 may send an error message to the mobile device 190 for display thereon and/or provide feedback to the user 192 via the lighting loads 122 (e.g., flash or change the color of the lighting loads 122). The order of the segments may be communicated to the mobile device 190 and the mobile device 190 may provide instructions for troubleshooting the problem. For example, the mobile device 190 may identify from the order that the second and third segments are out of order and instruct the user 192 to switch the order of these segments. The mobile device 190 and/or the lighting loads 122 may provide feedback verify to the user 192 that the segments have been installed in the proper order. Though the example verification procedure may be described with the sensor devices 140 as the designated verification devices used to verify the order of the segments of the linear lighting fixtures 126, other RF communication devices may be used in each segment of the linear lighting fixtures 126 for enabling communication of messages to perform verification.

Figure 3:
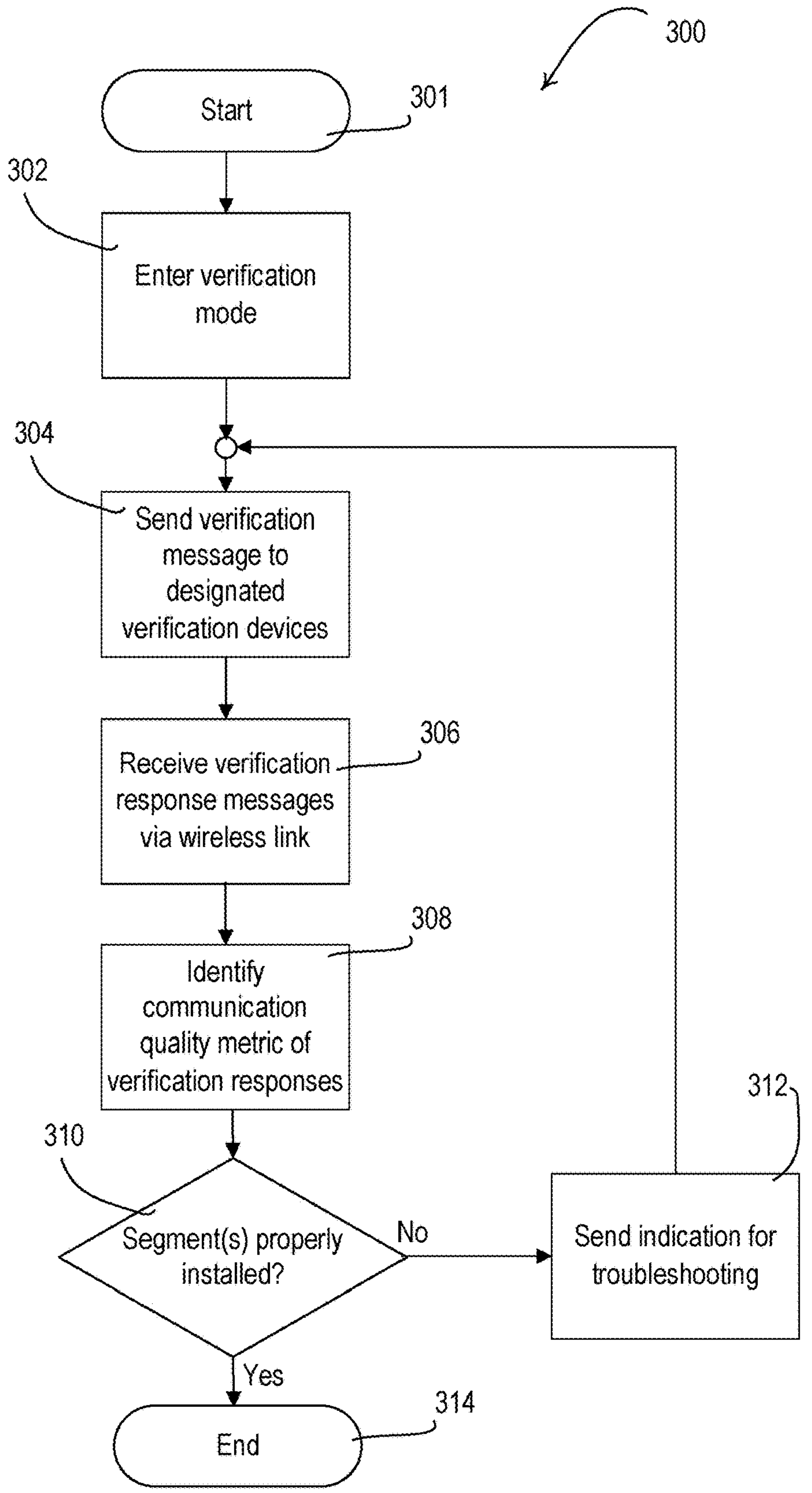
FIG. 3 is a flowchart of an example verification procedure that may be performed by one or more devices in a load control system.

FIG. 3 illustrates an example verification procedure 300 that may be performed by one or more devices in a load control system (e.g., the load control system 100 of FIG. 1) for verifying proper installation of one or more segments of a linear lighting fixture and enabling pre-configured control of the linear lighting fixtures. Though the procedure 300 may be described as being performed by a fixture controller, one or more portions of the procedure 300 may be performed by another device in the load control system (e.g., mobile device, lighting control devices, or other control devices). Additionally, though the procedure 300 may be described as being performed by a single device, the procedure 300, or portions thereof, may be distributed across multiple devices (e.g., multiple fixture controllers, a fixture controller and a mobile device, a fixture controller and a lighting control device, a mobile device and a lighting control device, multiple control devices, or other devices in the load control system).

As illustrated in FIG. 3, the procedure 300 may begin at 301. The procedure 300 may begin at 301 in response to the control circuit of the fixture controller receiving a message or an indication of an actuation of a button press on the fixture controller that is configured to cause the fixture controller to enter a commissioning mode or a configuration mode for performing verification. A message may be received at 301 from an input device (e.g., remote control device 170 or mobile device 190 shown in FIG. 1), for example. The message may be a verification triggering message configured to cause the fixture controller to enter a verification mode. In another example, the fixture controller may receive a commissioning message and enter the verification mode as part of a commissioning procedure.

At 302, the control circuit of the fixture controller may enter the verification mode configured to perform verification of the installation of the segments of the linear lighting fixture. The verification mode may be part of a commissioning mode or a configuration mode for commissioning the linear lighting fixture and/or the load control system. At 304, the control circuit of the fixture controller may send a verification message to the designated verification devices in the linear lighting fixture. Each segment of the linear lighting fixture may include a designated verification device. The designated verification device may be a lighting control device or a sensor device, for example. The designated verification device may store in memory an indicator that the device is the designated verification device, such that the designated verification device knows to respond to the verification message. The verification message may be sent to the designated verification device via a wired communication link (e.g., via the wired power/communication link) or via a wireless communication link.

The fixture controller may receive verification response messages from the designated verification device in each segment at 306. The verification response messages may each include a verification identifier of the designated verification device from which the verification response message is received. The verification identifier may be the unique identifier of the control device that is used to identify the control device in the load control system. Though the unique identifier of the device may be used, the designated verification device may have stored in memory a different verification identifier that may indicate a location or order in the linear lighting fixture at which the segment represented by the designated verification device is to be installed. For example, the verification identifier stored at the designated verification device that is to be installed in the first segment closest to the fixture controller may be “1”, the verification identifier stored at the designated verification device that is to be installed in the second segment from the fixture controller may be “2”, and so on.

At 308, the fixture controller may identify a communication quality metric of the verification response messages received from each of the designated verification devices. The verification response messages may be received via RF signals on a wireless communication link. The fixture controller may receive a verification response message from the designated verification device in each segment of the linear lighting fixture and record a communication quality metric (e.g., a signal strength identifier, such as an RSSI value) at which each of the verification response messages are received from the designated verification devices. From the measured communication quality metric (e.g., RSSI values) of each verification response message and the verification identifier of the designated verification device from which the verification message is received, the fixture controller may determine the relative distance of each of the designated verification devices from the fixture controller, and thus the relative distance of the corresponding segments in which the designated verification devices are installed. For example, the fixture controller may determine a relative order of the installed segments based on the signal strength at which each of the verification response messages are received.

At 310, the fixture controller may determine whether the segments of the linear lighting fixture are properly installed. For example, the segments of the linear lighting fixture may be configured to operate at a predefined location within the linear lighting fixture. The fixture controller may use measured communication quality metrics (e.g., RSSI values) to determine the relative order (e.g., strongest is closest and weaker are further) in which the segments are installed from the location of the fixture controller and compare the order in which the segments are installed with a predefined order stored in memory or from an order that is inferred from the received verification identifiers. For example, the fixture controller may have prestored thereon the order in which the segments and/or the designated verification devices within the segments should be installed. In another example, the order may be inferred from the verification identifiers of the designated verification themselves that are installed in each segment (e.g., closest designated verification device has identifier of “1”, next designated verification device has identifier of “2”, etc.).

If the segments are determined by the fixture controller to be out of order, the fixture controller may determine that the segments are improperly installed at 310 and send an indication for troubleshooting the installation to the user at 312. The indication that is sent at 312 may be an error message that is sent to the mobile device triggering display of a message on a graphical user interface provided to the user. The error message may include the verification identifiers and/or an identifier of the segments improperly installed for identification to the user on the graphical user interface displayed to the user. The message that is sent to the mobile device may identify the incorrectly installed segments and/or the proper order of the segments and the mobile device may provide instructions for troubleshooting the problem. For example, the mobile device may identify that the second and third segments are out of order and instruct the user to switch the order of these segments.

Additionally, or alternatively, the fixture controller may send a message to the lighting control devices in the linear lighting fixture that are configured to provide feedback to the user via the lighting loads (e.g., flash or change the color of the lighting loads) to indicate that the segments are improperly installed. As the fixture controller may know the identity of the segments that are improperly installed, the fixture controller may send the message to the lighting control devices in the improperly installed segments to cause them to provide the feedback to the user.

If a verification response message fails to be received from one or more of the designated verification devices, the fixture controller may determine at 310 that the segment in which this designated verification device is included has failed to be properly installed. The fixture controller may send the error message to the mobile device and indicate that the designated verification device failed to respond or is improperly installed. The fixture controller may also send a message to one or more lighting control devices in the linear lighting fixture to cause the lighting control devices to provide feedback to the user via the lighting loads (e.g., flash or change the color of the lighting loads) to indicate that the segments are improperly installed or are missing.

After sending an indication that the segments failed to be properly installed at 312, the procedure 300 may return to 304 and send verification messages to the designated verification devices for verifying the installation. The verification message may be sent to each of the designated verification devices or just the designated verification devices that were previously installed improperly. The fixture controller may determine at 310 that the segments have been properly installed and the procedure 300 may end. After the verification procedure 300 is used to verify that the segments have been properly installed, the pre-stored system configuration data that is stored at one or more devices in the load control system for enabling out-of-box configuration may be implemented. For example, computer-executable instructions may be pre-stored in memory that include pre-stored system configuration data at the fixture controller, the lighting control devices, the system controller, and/or the input devices for enabling certain control of the lighting loads at the linear lighting fixture. The pre-stored system configuration data may include association information, predefined scenes, predefined zones, predefined lighting intensities to which to control lighting loads in response to inputs, predefined color temperatures to which to control lighting loads in response to inputs, predefined colors to which to control lighting loads in response to inputs, timing schedules at which to control zones of lighting loads, and/or other system configuration data.

Though the procedure 300 is described as being performed by a fixture controller of a linear lighting fixture, one or more portions of the procedure 300 may be performed by another device in the load control system. For example, the mobile device may enter the verification mode at 302 in response to receiving a user input and send the verification message to the designated verification devices at 304 for verifying whether the segments are properly installed at 310. The verification message may be sent via a wireless communication link, such as a wireless communication link that implements a short-range communication protocol (e.g., BLUETOOTH or BLUETOOTH LOW ENERGY (BLE) protocol). The mobile device may be positioned at a location relative to a portion of the linear lighting fixture to determine whether the segments have been properly installed based on the identified communication quality metric of the verification responses at 308. For example, the user may position the mobile device toward or at an end of the linear lighting fixture before sending the verification message at 304. The mobile device may receive the verification response messages at 306 and identify the communication quality metric of the verification responses at 308. The mobile device may determine, at 310, whether the segments are properly installed from the verification identifiers received in the verification responses and/or a pre-stored order in memory. The mobile device may provide feedback to the user of the improperly installed segments on a graphical user interface and/or send a message to the fixture controller or the lighting control devices for providing feedback to the user via the lighting loads (e.g., flash or change the color of the lighting loads) to indicate that the segments are improperly installed or are missing. After the segments are determined to be properly installed at 310, the mobile device may send a message to the fixture controller and/or the system controller to cause the system controller and/or the system controller to operate according to the pre-stored system configuration data. The mobile device itself may also operate according to the pre-stored system configuration data.

Figure 4:
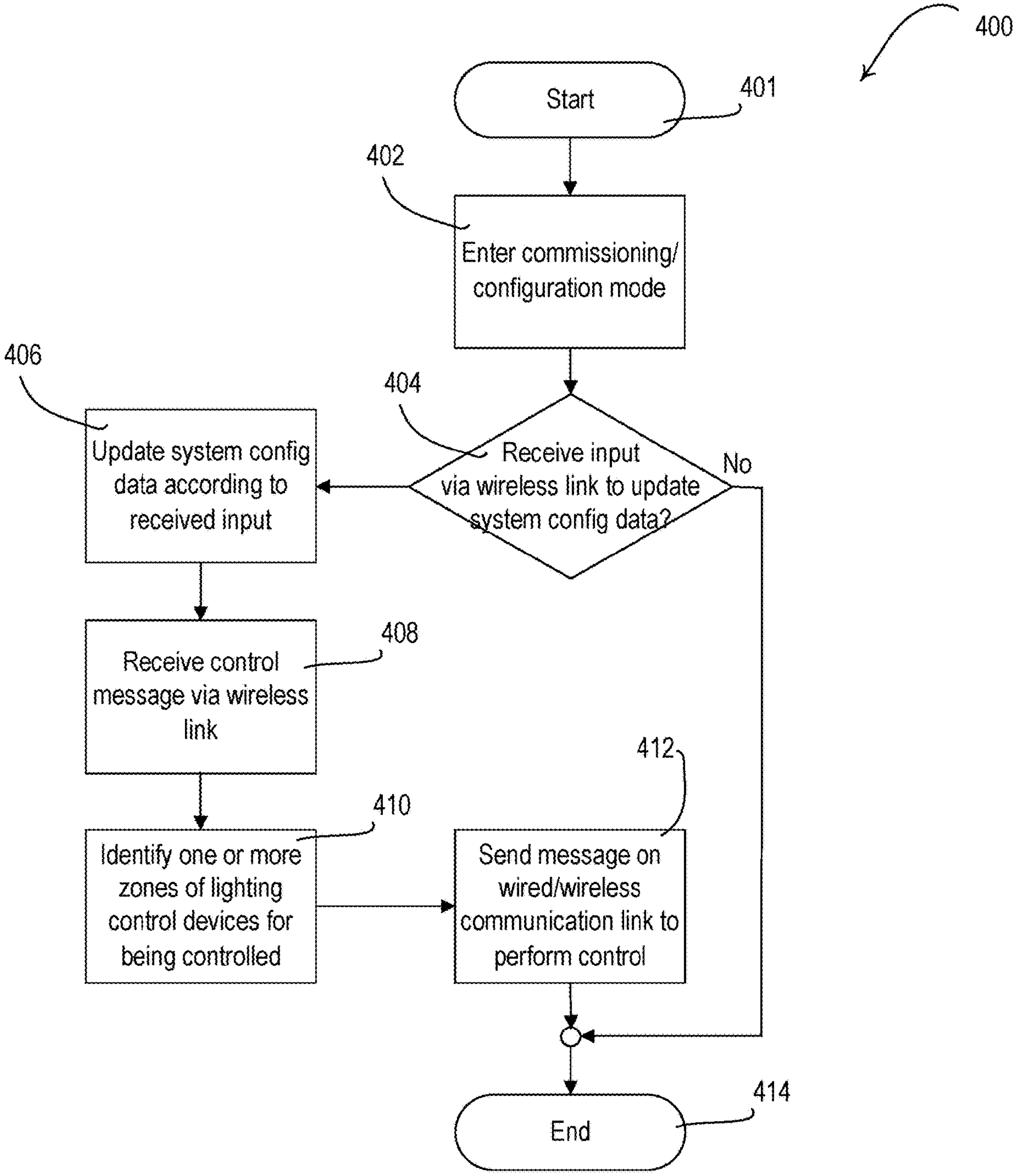
FIG. 4 is a flowchart of an example procedure that may be performed by one or more devices in a load control system for performing commissioning and/or configuration of one or more linear lighting fixtures and enabling control of the linear lighting fixtures.

FIG. 4 illustrates an example procedure 400 that may be performed by one or more devices in a load control system (e.g., the load control system 100 of FIG. 1) for performing commissioning and/or configuration of one or more linear lighting fixtures and enabling control of the linear lighting fixtures. Though the procedure 400 may be described as being performed by a fixture controller, one or more portions of the procedure 400 may be performed by another device in the load control system (e.g., system controller, lighting control devices, or other control devices). Additionally, though the procedure 400 may be described as being performed by a single device, the procedure 400, or portions thereof, may be distributed across multiple devices (e.g., multiple fixture controllers 128, system controllers, a system controller and a fixture controller 128, a fixture controller 128 and a lighting control device 124, a system controller 110 and a lighting control device 124, multiple control devices, or other devices in the load control system).

As illustrated in FIG. 4, the procedure 400 may begin at 401. The procedure 400 may begin at 401 in response to the control circuit of the fixture controller receiving a message or an indication of an actuation of a button press on the fixture controller that is configured to cause the fixture controller to enter a commissioning mode or a configuration mode. A message may be received at 401 from an input device (e.g., remote control device 170 or mobile device 190 shown in FIG. 1), for example.

At 402, the control circuit of the fixture controller may enter a commissioning mode or a configuration mode to generate or update system configuration data configured to perform control of the lighting loads in the load control system. The system configuration data may include scenes for controlling the intensity level, color temperature, and/or color of the lighting loads in response to certain input. The system configuration data may include defined zones that include a zone identifier for one or more lighting control devices and/or lighting loads in a linear lighting fixture. The system configuration data may include lighting intensities, color temperatures, and/or colors to which to control one or more zones of lighting control devices in response to defined input. The system configuration data may include associations of devices in the load control system. For example, the configuration data may include associations of sensor devices and lighting control devices within the linear lighting fixture. The system configuration data may include associations of other input devices (e.g., remote control device 170) in the load control system with the lighting control devices or zones of lighting control devices in a linear lighting fixture. The system configuration data may include timing schedules at which one or more zones of lighting control devices within a linear lighting fixture may be controlled to an intensity, color temperature, or color.

At 404, the control circuit of the fixture controller may determine whether input has been received via a wireless communication link to update the system configuration data. The input may be received from an input device in the load control system, such as a remote control device or a mobile device. If no input is received at 404 for updating the system configuration data (e.g., after a predefined period of time or before a subsequent message or actuation), the control circuit of the fixture controller may end the procedure 400 at 414.

In one example, the user may use the mobile device to commission or configure components of the linear lighting fixtures. The user may select one or more devices on a graphical user interface being displayed on the mobile device for being commissioned or configured. For example, the user may select one or more lighting control devices, one or more sensor devices or other input devices (e.g., remote control devices), and/or one or more fixture controllers. The user may include the selected devices in scenes for controlling the intensity level, color temperature, and/or color of the lighting loads in response to certain inputs. The user may define zones for the selected devices for enabling zone control. The user may select lighting intensities, color temperatures, and/or colors to which to control one or more lighting control devices. The user may select associations of the selected devices in the load control system for being associated with one another. The user may select timing schedules at which one or more zones of lighting control devices within a linear lighting fixture may be controlled to an intensity, color temperature, or color. In response to the user selections, the control circuit of the mobile device may generate the system configuration data that is sent in a message as input for being received by the fixture controller at 404.

The user may provide the input at 404 via another input device, such as a remote control device of the load control system. In an example, the user may make selections on the remote control device in response to instructions provided on the graphical user interface of the mobile device. The user selections may be provided via the remote control device as a sequence of inputs provided by the user in response to the instructions provided on the graphical user interface of the mobile device. After the user provides input on a first graphical user interface, the mobile device may detect the input or receive a message that the input has been provided and display a subsequent graphical user interface for instructing the user. The input provided by the user on the remote control device may result in the selection of one or more devices for being commissioned or configured. For example, the user may select one or more lighting control devices, one or more sensor devices or other input devices (e.g., remote control devices), and/or one or more fixture controllers via input on the remote control device. The user may provide input on the remote control device of one or more scenes for controlling the intensity level, color temperature, and/or color of the lighting loads. The user may define zones for the selected devices for enabling zone control via the input on the remote control device. The user may select lighting intensities, color temperatures, and/or colors to which to control one or more lighting control devices via the input on the remote control device. The user may select associations of the selected devices in the load control system for being associated with one another via the input on the remote control device. The user may select timing schedules via the input on the remote control device at which one or more zones of lighting control devices within a linear lighting fixture may be controlled to an intensity, color temperature, or color. In response to the user selections, the control circuit of the fixture controller may generate the system configuration data.

The input that is received at 404 by the fixture controller may be received on one or more wireless communication links. For example, the mobile device may provide the input to the fixture controller using a short-range communication protocol, such as the BLUETOOTH or BLUETOOTH LOW ENERGY (BLE) protocols, for example. The mobile device may communicate directly with the fixture controller in response to the user input to configure the linear lighting fixtures during commissioning. In another example, the mobile device may communicate with the fixture controller via an intermediary device, such as the system controller. The mobile device may provide the input to the fixture controller on another wireless communication protocol, such as a proprietary RF protocol (e.g., CLEAR CONNECT TYPE A and/or CLEAR CONNECT TYPE X protocols) or another standard protocol (e.g., ZIGBEE, THREAD, or another protocol).

At 406, the control circuit of the fixture controller may update the system configuration data according to the received inputs. For example, the fixture controller may store the system configuration data in memory for identifying input devices from which messages are received and/or performing control of one or more lighting control devices in the linear lighting fixture. If there is not prior system configuration data to update, the control circuit of the fixture controller may generate the system configuration data for being stored thereon.

After the system configuration data is updated and/or stored at the fixture controller, the fixture controller may receive a control message at 408 via a wireless communication link. The control message may be received by an input device (e.g., remote control device, sensor device, or mobile device) or the system controller via a wireless communication link. The wireless communication link may be the same wireless communication link as the wireless communication link on which the input is received at 404 or a different wireless communication link. For example, the fixture controller may receive the control message at 408 from the mobile device or the remote control device on the same wireless link on which the input is received at 404. In another example, the fixture controller may receive the input message from the mobile device at 404 on a different wireless communication link and using a different wireless communication protocol than the control message is received at 408 (e.g., from a remote control device, sensor device, or system controller). Though described as being received via a wireless communication link at 408, the control message may be received via a wired communication link at 408. For example, the fixture controller may receive the control message via a wired communication link from a sensor device within the same linear lighting fixture.

The fixture controller may identify one or more zones of lighting control devices in the linear lighting fixture for being controlled at 410 in response to the received control message at 408. For example, the fixture controller may identify one or more zones of lighting control devices in the linear lighting fixture that are associated with the input device from which the control message was received at 408. The control message may include a scene identifier or zone identifier that indicates in the system configuration data the lighting control devices in the linear lighting fixture that are to be controlled. The control message may include control instructions or may indicate a scene identifier or other input corresponding to control instructions for controlling the identified lighting control devices. The control circuit of the fixture controller may identify the one or more zones of lighting control devices and the control instructions that indicate the lighting intensity, color temperature, and/or color for controlling the zones of lighting control devices and send a message at 412 to perform control. The message may be sent at 412 via a wired or wireless communication link. For example, the message may be sent at 412 via a wired communication link, such as the wired communication link 120 shown in FIG. 1 within the linear lighting fixtures. As the lighting control devices may also each comprise a wireless communication circuit, the fixture controller may send the message for enabling control via a wireless communication link. The wireless communication link may be the same or different from the wireless communication link on which the input is received at 404 and/or on which the control message is received at 408. The lighting control device or devices may receive the message comprising the load control instructions and control the corresponding electrical loads in response to the received message from the fixture controller. The procedure 400 may end at 414.

Though the procedure 400 is described as being performed by a fixture controller of a linear lighting fixture, one or more portions of the procedure 400 may be performed by another device in the load control system. For example, the system controller may enter the commissioning or configuration mode at 402 and receive the input at 404 for updating the system configuration data at 406. The system configuration data may be used by the system controller to perform control within the load control system and/or the system configuration data may be transmitted to the fixture controller and/or the lighting control devices for performing control in response to subsequent messages that are received from devices in the load control system. For example, the system controller may receive the control message at 408 and use the system configuration data to identify one or more zones of lighting control devices at 410 for being controlled and transmit the message at 412 for enabling such control. The system controller may identify the linear lighting fixture and/or fixture controller to which to transmit one or more messages for performing control in response to the received control message. The system controller may also, or alternatively, identify the lighting control devices to which to transmit one or more messages for performing control in response to the received control message. In another example, the fixture controller may receive the updated system configuration data from the system controller and receive the control message directly at 408 for identifying the zones of lighting control devices at 410 and sending messages to the lighting control devices at 412.

Figure 5:
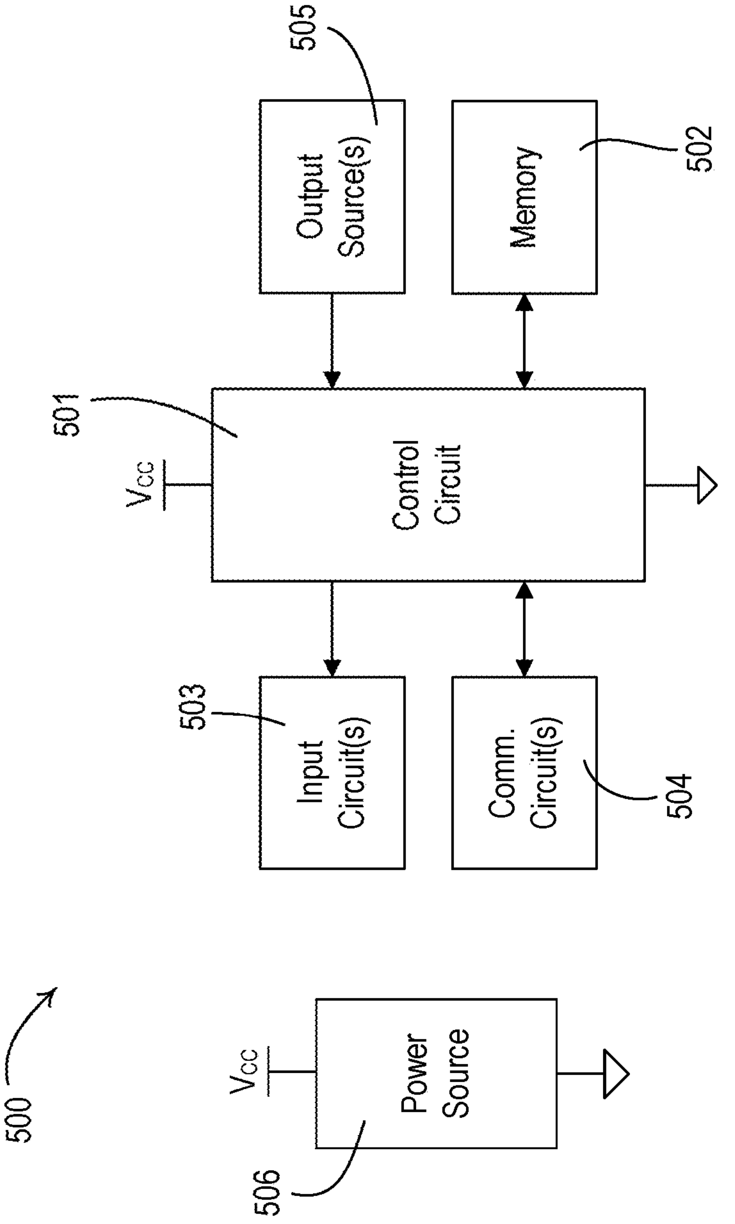
FIG. 5 is a block diagram illustrating an example of a device capable of processing and/or communication in a load control system, such as the load control system of FIG. 1.

FIG. 5 is a block diagram illustrating an example of a device 500 capable of processing and/or communication in a load control system, such as the load control system 100 of FIG. 1. In an example, the device 500 may be a control device capable of transmitting or receiving messages. The control device may be in an input device, such as a sensor device (e.g., the sensor device 140 shown in FIG. 1), a remote control device (e.g., the remote control device 170 shown in FIG. 1), or another input device capable of transmitting messages to load control devices or other devices in the load control system 100. The device 500 may be a computing device, such as a mobile device (e.g., the mobile device 190 shown in FIG. 1), a system controller (e.g., the system controller 110 shown in FIG. 1), or another computing device in a load control system.

The device 500 may include a control circuit 501 for controlling the functionality of the device 500. The control circuit 501 may include one or more general purpose processors, special purpose processors, conventional processors, digital signal processors (DSPs), microprocessors, integrated circuits, a programmable logic device (PLD), application specific integrated circuits (ASICs), or the like. The control circuit 501 may perform signal coding, data processing, image processing, power control, input/output processing, or any other functionality that enables the device 500 to perform as one of the devices of the load control system (e.g., load control system 100) described herein.

The control circuit 501 may be communicatively coupled to a memory 502 to store information in and/or retrieve information from the memory 502. The memory 502 may comprise a computer-readable storage media or machine-readable storage media that maintains a device dataset of associated device identifiers, system configuration data, and/or computer-executable instructions for performing as described herein. For example, the memory 502 may comprise computer-executable instructions or machine-readable instructions that include one or more portions of a commissioning or configuration procedure (e.g., procedure 400 shown in FIG. 4) as described herein. Additionally, or alternatively, the memory 502 may comprise computer-executable instructions or machine-readable instructions that include one or more portions of a verification procedure (e.g., verification procedure 300 shown in FIG. 3) as described herein. The control circuit 500 may access the instructions from memory 502 for being executed to cause the control circuit 501 to operate as described herein, or to operate one or more devices as described herein. The memory 502 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory 502 may be implemented as an external integrated circuit (IC) or as an internal circuit of the control circuit 501.

The device 500 may include one or more communication circuits 504 that are in communication with the control circuit 501 for sending and/or receiving information as described herein. The communication circuits 504 may perform wireless and/or wired communications. The communication circuits 504 may include a wired communication circuit capable of communicating on a wired communication link. The wired communication link may be a wired power/communication link (e.g., the wired power/communication link 124). The wired communication link may include an Ethernet communication link, an RS-485 serial communication link, a 0-10 volt analog link, a pulse-width modulated (PWM) control link, a Digital Addressable Lighting Interface (DALI) digital communication link, and/or another wired communication link. The communication circuit 134 may be configured to communicate via power lines (e.g., the power lines from which the device 500 receives power) using a power line carrier (PLC) communication technique. The communication circuits 504 may include a wireless communication circuit including one or more RF or infrared (IR) transmitters, receivers, transceivers, or other communication circuits capable of performing wireless communications.

Though a single communication circuit 504 may be illustrated, multiple communication circuits may be implemented in the device 500. For example, when the device 500 is a mobile device or a system controller, the device may be configured to communicate via multiple wireless communication links. When the device 500 is an input device, such as a sensor device in a linear lighting fixture, the device 500 may be configured to communicate via a wired communication link and a wireless communication link. The device 500 may include a communication circuit configured to communicate via one or more wired and/or wireless communication networks and/or protocols and at least one other communication circuit configured to communicate via one or more other wired and/or wireless communication networks and/or protocols. For example, a first communication circuit may be configured to communicate via a wired or wireless communication link, while another communication circuit may be capable of communicating on another wired or wireless communication link. The first communication circuit may be configured to communicate via a first wireless communication link (e.g., a wireless network communication link) using a first wireless protocol (e.g., a wireless network communication protocol, such as the CLEAR CONNECT (e.g., CLEAR CONNECT A and/or CLEAR CONNECT X) and/or THREAD protocols), and the second communication circuit may be configured to communicate via a second wireless communication link (e.g., a short-range or direct wireless communication link) using a second wireless protocol (e.g., a short-range wireless communication protocol, such as the BLUETOOTH and/or BLUETOOTH LOW ENERGY (BLE) protocols).

One of the communication circuits 504 may comprise a beacon transmitting and/or receiving circuit capable of transmitting and/or receiving beacon messages via a short-range RF signal. The control circuit 501 may communicate with beacon transmitting circuit (e.g., a short-range communication circuit) to transmit beacon messages. The beacon transmitting circuit may communicate beacon messages via RF communication signals, for example. The beacon transmitting circuit may be a one-way communication circuit (e.g., the beacon transmitting circuit is configured to transmit beacon messages) or a two-way communication circuit capable of receiving information on the same network and/or protocol on which the beacon messages are transmitted (e.g., the beacon transmitting circuit is configured to transmit and receive beacon messages). The information received at the beacon transmitting circuit may be provided to the control circuit 501.

The control circuit 501 may be in communication with one or more input circuits 503 from which inputs may be received. The input circuits 503 may be included in a user interface for receiving inputs from the user. For example, the input circuits 503 may include an actuator (e.g., a momentary switch that may be actuated by one or more physical buttons) that may be actuated by a user to communicate user input or selections to the control circuit 501. In response to an actuation of the actuator, the control circuit 501 may enter an association mode, transmit association messages from the device 500 via the communication circuits 504, and/or receive other information (e.g., control instructions for performing control of an electrical load). In response to an actuation of the actuator, the control circuit 501 may perform control by transmitting control instructions indicating the actuation on the user interface and/or the control instructions generated in response to the actuation. The actuator may include a touch sensitive surface, such as a capacitive touch surface, a resistive touch surface an inductive touch surface, a surface acoustic wave (SAW) touch surface, an infrared touch surface, an acoustic pulse touch surface, or another touch sensitive surface that is configured to receive inputs (e.g., touch actuations/inputs), such as point actuations or gestures from a user. The control circuit 501 of the device 500 may enter the association mode, transmit an association message, transmit control instructions, or perform other functionality in response to an actuation or input from the user on the touch sensitive surface.

The input circuits 503 may include a sensing circuit (e.g., a sensor). The sensing circuit may be an occupant sensing circuit, a temperature sensing circuit, a color (e.g., color temperature) sensing circuit, a visible light sensing circuit (e.g., a camera), a daylight sensing circuit or ambient light sensing circuit, or another sensing circuit for receiving input (e.g., sensing an environmental characteristic in the environment of the device 500). The control circuit 501 may receive information from the one or more input circuits 503 and process the information for performing functions as described herein. For example, the control circuit may receive information from the sensing circuit and send a message on a wired or wireless communication link via the communication circuits 504 for enabling load control.

The control circuit 501 may be in communication with one or more output sources 505. The output sources 505 may include one or more light sources (e.g., LEDs) for providing indications (e.g., feedback) to a user. The output sources 505 may include a display (e.g., a visible display) for providing information (e.g., feedback) to a user. The control circuit 501 and/or the display may generate a graphical user interface (GUI) generated via software for being displayed on the device 500 (e.g., on the display of the device 500).

The user interface of the device 500 may combine features of the input circuits 503 and the output sources 505. For example, the user interface may have buttons that actuate the actuators of the input circuits 503 and may have indicators (e.g., visible indicators) that may be illuminated by the light sources of the output sources 505. In another example, the display and the control circuit 501 may be in two-way communication, as the display may display information to the user and include a touch screen capable of receiving information from a user. The information received via the touch screen may be capable of providing the indicated information received from the touch screen as information to the control circuit 501 for performing functions or control.

Each of the hardware circuits within the device 500 may be powered by a power source 506. The power source 506 may include a power supply configured to receive power from an alternating-current (AC) power supply or a direct-current (DC) power supply, for example. In addition, the power source 506 may comprise one or more batteries. The power source 506 may produce a supply voltage $V_{CC}$ for powering the hardware within the device 500.

Figure 6:
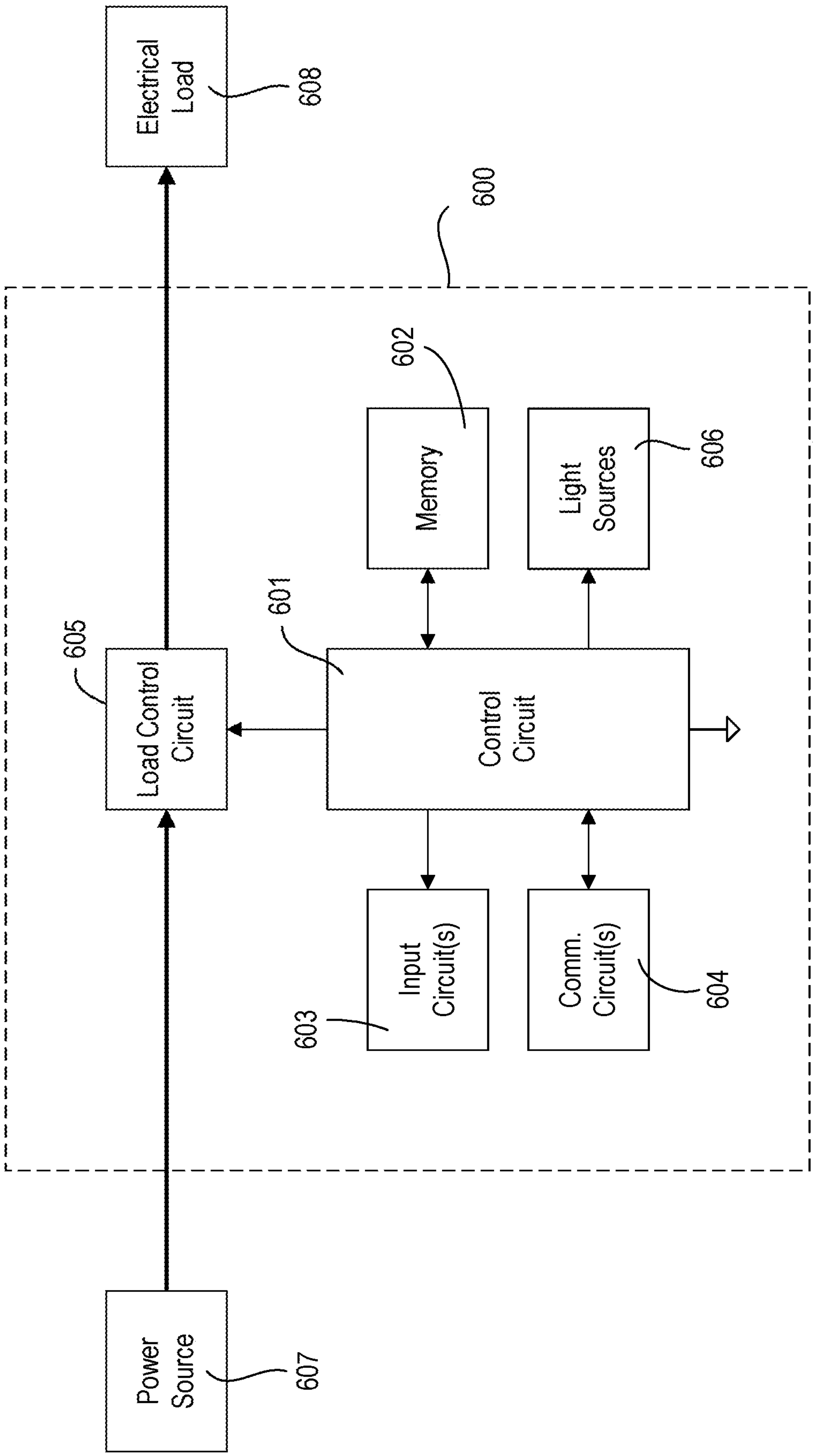
FIG. 6 is a block diagram illustrating an example of a load control device capable of operating in a load control system, such as the load control system of FIG. 1.

FIG. 6 is a block diagram illustrating an example load control device 600. The load control device 600 may be a lighting control device (e.g., the lighting control device 124). The load control device 600 may be a dimmer switch, an electronic switch, a ballast or an electronic lighting control device for lamps, an LED driver for LED light sources or other lighting control device. The load control device 600 may include a control circuit 601 for controlling the functionality of the load control device 600. The control circuit 601 may include one or more general purpose processors, special purpose processors, conventional processors, digital signal processors (DSPs), microprocessors, integrated circuits, a programmable logic device (PLD), application specific integrated circuits (ASICs), or the like. The control circuit 601 may perform signal coding, data processing, image processing, power control, input/output processing, or any other functionality that enables the load control device 600 to perform as one of the lighting control devices of the load control system (e.g., load control system 100) described herein.

The load control device 600 may include a load control circuit 605 that may be electrically coupled in series between a power source 607 (e.g., an AC power source and/or a DC power source) and an electrical load 608. The control circuit 601 may be configured to control the load control circuit 605 for controlling the electrical load 605, for example, in response to received instructions and/or messages. The electrical load 608 may include a lighting load. The lighting load may comprise one or more light emitting diodes (LEDs). The control circuit 601 and/or the load control circuit 605 may adjust the intensity of one or more LEDs. For example, the intensity of the one or more LEDs may be adjusted to achieve a certain intensity level, color temperature, and/or color output. The load control circuit 605 may alternatively comprise a ballast for controlling a fluorescent lamp. The load control circuit 605 may receive instructions from the control circuit 601 and may control the electrical load 608 based on the received instructions. The load control circuit 605 may send status feedback to the control circuit 601 regarding the status of the electrical load 608.

The control circuit 601 may be communicatively coupled to a memory 602 to store information in and/or retrieve information from the memory 602. The control circuit 604 may store information in and/or retrieve information from the memory 606. The memory 602 may comprise a computer-readable storage media or machine-readable storage media that maintains a device dataset of associated device identifiers, system configuration data, and/or computer-executable instructions for performing as described herein. For example, the memory 602 may comprise computer-executable instructions or machine-readable instructions enable the control circuit 601 to perform as described herein for operating in a linear lighting fixture. The control circuit 601 may access the instructions from memory 602 for being executed to cause the control circuit 601 to operate as described herein, or to operate one or more devices as described herein. The memory 602 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory 602 may be implemented as an external integrated circuit (IC) or as an internal circuit of the control circuit 601.

The load control device 600 may include one or more communication circuits 604 that are in communication with the control circuit 601 for sending and/or receiving information as described herein. The communication circuits 604 may perform wireless and/or wired communications. The communication circuit 604 may be a wired communication circuit capable of communicating on a wired communication link. The wired communication link may be a wired power/communication link (e.g., the wired power/communication link 124). The wired communication link may include an Ethernet communication link, an RS-485 serial communication link, a 0-10 volt analog link, a pulse-width modulated (PWM) control link, a Digital Addressable Lighting Interface (DALI) digital communication link, and/or another wired communication link. The communication circuit 604 may be configured to communicate via power lines (e.g., the power lines from which the load control device 600 receives power) using a power line carrier (PLC) communication technique. The communication circuit 604 may be a wireless communication circuit including one or more RF or IR transmitters, receivers, transceivers, or other communication circuits capable of performing wireless communications.

Though a single communication circuit 604 may be illustrated, multiple communication circuits may be implemented in the load control device 600. The load control device 600 may include a communication circuit configured to communicate via one or more wired and/or wireless communication networks and/or protocols and at least one other communication circuit configured to communicate via one or more other wired and/or wireless communication networks and/or protocols. For example, a first communication circuit may be configured to communicate via a wired or wireless communication link, while another communication circuit may be capable of communicating on another wired or wireless communication link. The first communication circuit may be configured to communicate via a first wireless communication link (e.g., a wireless network communication link) using a first wireless protocol (e.g., a wireless network communication protocol, such as the CLEAR CONNECT (e.g., CLEAR CONNECT A and/or CLEAR CONNECT X) and/or THREAD protocols), and the second communication circuit may be configured to communicate via a second wireless communication link (e.g., a short-range or direct wireless communication link) using a second wireless protocol (e.g., a short-range wireless communication protocol, such as the BLUETOOTH and/or BLUETOOTH LOW ENERGY (BLE) protocols) or on a wired communication link using a wired communication protocol.

One of the communication circuits 604 may comprise a beacon transmitting and/or receiving circuit capable of transmitting and/or receiving beacon messages via a short-range RF signal. A control circuit 601 may communicate with beacon transmitting circuit (e.g., a short-range communication circuit) to transmit beacon messages. The beacon transmitting circuit may communicate beacon messages via RF communication signals, for example. The beacon transmitting circuit may be a one-way communication circuit (e.g., the beacon transmitting circuit is configured to transmit beacon messages) or a two-way communication circuit capable of receiving information on the same network and/or protocol on which the beacon messages are transmitted (e.g., the beacon transmitting circuit is configured to transmit and receive beacon messages). The information received at the beacon transmitting circuit may be provided to the control circuit 601.

The control circuit 601 may be in communication with one or more input circuits 603 from which inputs may be received. The input circuits 603 may be included in a user interface for receiving inputs from the user. For example, the input circuits 603 may include an actuator (e.g., a momentary switch that may be actuated by one or more physical buttons) that may be actuated by a user to communicate user input or selections to the control circuit 601. In response to an actuation of the actuator, the control circuit 601 may enter an association mode, transmit association messages from the load control device 600 via the communication circuits 604, and/or receive other information. In response to an actuation of the actuator may perform control by controlling the load control circuit 605 to control the electrical load 608, and/or by transmitting control instructions indicating the actuation on the user interface and/or the control instructions generated in response to the actuation. As the load control device 600 may be included in a linear lighting fixture with a fixture controller, the load control device 600 may be put in an association mode in response to an association message received via one or more of the communication circuits 604. The actuator may include a touch sensitive surface, such as a capacitive touch surface, a resistive touch surface an inductive touch surface, a surface acoustic wave (SAW) touch surface, an infrared touch surface, an acoustic pulse touch surface, or another touch sensitive surface that is configured to receive inputs (e.g., touch actuations/inputs), such as point actuations or gestures from a user. The control circuit 601 of the load control device 600 may enter the association mode, transmit an association message, control the load control circuit 605, transmit control instructions, or perform other functionality in response to an actuation or input from the user on the touch sensitive surface.

The input circuits 603 may include a sensing circuit (e.g., a sensor). The sensing circuit may be an occupant sensing circuit, a temperature sensing circuit, a color (e.g., color temperature) sensing circuit, a visible light sensing circuit (e.g., a camera), a daylight sensing circuit or ambient light sensing circuit, or another sensing circuit for receiving input (e.g., sensing an environmental characteristic in the environment of the load control device 600). The control circuit 601 may receive information from the one or more input circuits 603 and process the information for performing functions as described herein.

The control circuit 601 may illuminate light sources 606 (e.g., LEDs) to provide feedback to a user. Though feedback may instead be provided via the electrical load 608 (e.g., lighting load) by illuminating the lighting load different intensities and/or colors. The control circuit 601 may be operable to illuminate the light sources 606 different colors. The light sources 606 may be illuminate, for example, one or more indicators (e.g., visible indicators) of the load control device 600.

Figure 7:
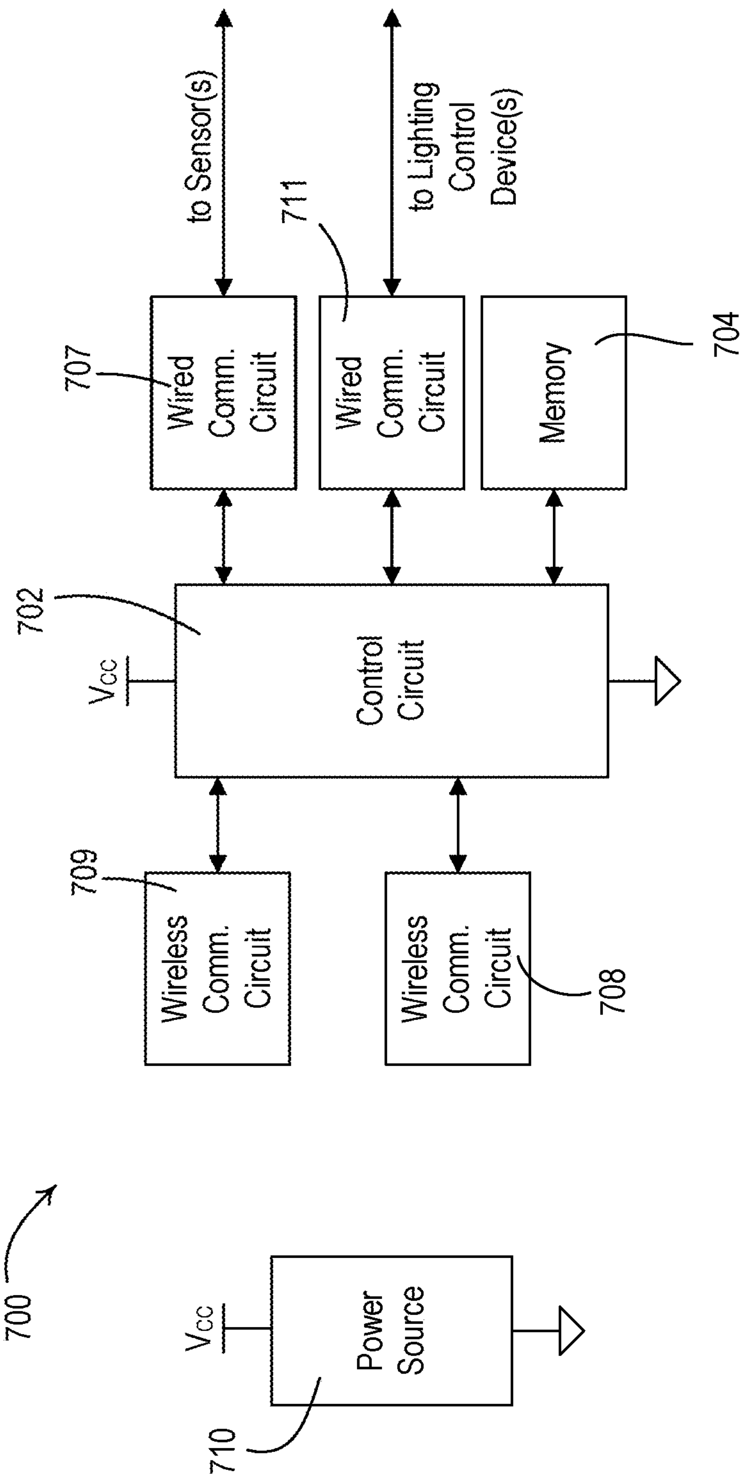
FIG. 7 is a block diagram of an example controller.

FIG. 7 is a block diagram illustrating an example controller 700, as described herein. The controller 700 may be attached to a linear lighting fixture, such as the fixture controller 128 of the lighting fixture 126 described herein.

The controller 700 may include a control circuit 702 for controlling the functionality of the controller 700. The control circuit 702 may include one or more general purpose processors, special purpose processors, conventional processors, digital signal processors (DSPs), microprocessors, integrated circuits, a programmable logic device (PLD), application specific integrated circuits (ASICs), or the like. The control circuit 702 may perform signal coding, data processing, power control, input/output processing, or any other functionality that enables the controller 800 to perform as described herein.

The control circuit 702 may store information in and/or retrieve information from the memory 704. The memory 704 may comprise a computer-readable storage media or machine-readable storage media that maintains a device dataset of associated device identifiers, system configuration data, and/or computer-executable instructions for performing as described herein. For example, the memory 704 may comprise computer-executable instructions or machine-readable instructions that include one or more portions of a commissioning or configuration procedure (e.g., procedure 400 shown in FIG. 4) as described herein. Additionally, or alternatively, the memory 704 may comprise computer-executable instructions or machine-readable instructions that include one or more portions of a verification procedure (e.g., verification procedure 300 shown in FIG. 3) as described herein. The control circuit 702 may access the instructions from memory 704 for being executed to cause the control circuit 702 to operate as described herein, or to operate one or more devices as described herein. The memory 704 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory 704 may be implemented as an external integrated circuit (IC) or as an internal circuit of the control circuit 701.

The controller 700 may include one or more wired communication circuits, such as wired communication circuit 707 and/or wired communications circuit 711, for transmitting and/or receiving information. The wired communication circuits 707, 711 may transmit and/or receive information via wired communication links (e.g., the wired power/communication link 120 described herein). The communications circuits 707, 711 may include a transmitter, a receiver, a transceiver, or other circuit capable of performing wired communications. In one example, the communications circuit 707 may communicate on a wired digital communication link to one or more sensors in a linear lighting fixture, while the wired communications circuit 711 may communicate on a wired 0-10V analog communication link to one or more lighting control devices. Though multiple wired communication circuits are illustrated in FIG. 7, the controller 700 may include a single wired communication circuit for communicating with the sensors, lighting control devices, and/or other devices. For example, the wired communication link may be a DALI communication link, as described herein.

The controller 700 may include one or more wireless communication circuits, such as wireless communication circuit 708 and/or wireless communication circuit 709, for transmitting and/or receiving information. The wireless communication circuits 708, 709 may transmit and/or receive information via RF signals (e.g., RF signals 108, 109 described herein). The communications circuits 708, 709 may include an RF transmitter, RF receiver, RF transceiver, or other circuit capable of performing wireless communications. In one example, the wireless communications circuit 708 may be configured to communicate on a first wireless communication link using a first communication protocol (e.g., communicating with a mobile device via a short-range communication signal, such as BLUETOOTH or BLE), and the wireless communications circuit 709 may be configured to communicate on a second wireless communication link using a second communication protocol (e.g., communicate with sensors, remote control devices, and/or system controllers using another wireless communication protocol, such as THREAD, ZIGBEE, or a proprietary communication protocol, such as CLEAR CONNECT A or CLEAR CONNECT X). Though multiple wireless communication circuits are illustrated in FIG. 7, the controller 700 may include a single wireless communication circuits for communicating with the sensors, lighting control devices, and/or other devices via one or more communication protocols.

Each of the circuits within the controller 700 may be powered by a power source 710. The power source 710 may be an AC power source or a DC power source. The power source 710 may be a battery power source. The controller 700 may receive power via the wired power-communication link (e.g., DALI link) on which communications may be transmitted/received.

Although features and elements are described herein in particular combinations, each feature or element can be used alone or in any combination with the other features and elements. The methods described herein may be implemented in a computer program, software, instructions, or firmware stored on one or more non-transitory computer-readable media for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A lighting device comprising:

a power/communication link configured for communication and for providing power to at least one lighting load;

at least one first segment, wherein the at least one first segment comprises a corresponding lighting load of the at least one lighting load connected to the power/communication link;

at least one second segment, wherein the at least one second segment comprises an occupancy sensor connected to the power/communication link, wherein the occupancy sensor is configured to detect at least one of an occupancy condition or a vacancy condition in a space;

a controller comprising at least one communication circuit configured to transmit one or more first messages via the power/communication link, the controller configured to control the at least one lighting load via the one or more first messages, and wherein the occupancy sensor is configured to transmit one or more second messages to the communication circuit via the power/communication link, the one or more second messages comprising an indication of the at least one of the occupancy condition or the vacancy condition in the space.

2. The lighting device of claim 1, wherein the at least one first segment comprises a plurality of separate lighting segments, and wherein the controller being configured to control the at least one lighting load via the one or more first messages comprises the controller being configured to control at least one corresponding lighting load in each of the plurality of separate lighting segments based on the one or more first messages.

3. The lighting device of claim 2, wherein each lighting segment of the plurality of separate lighting segments is configured for independent communication on the power/communication link using a corresponding identifier for receiving the one or more first messages for controlling the corresponding lighting load.

4. The lighting device of claim 2, wherein each lighting segment of the plurality of separate lighting segments is attachable to and detachable from at least one other lighting segment of the plurality of separate lighting segments.

5. The lighting device of claim 2, wherein each lighting segment of the plurality of separate lighting segments is associated with a respective zone.

6. The lighting device of claim 5, wherein each lighting segment of the plurality of separate lighting segments is configured for independent communication via the power/communication link using a unique zone identifier for the respective zone.

7. The lighting device of claim 1, wherein the occupancy sensor is mechanically connected to a first segment of the at least one first segment.

8. The lighting device of claim 1, wherein the power/communication link comprises a wired power/communication link, and wherein the occupancy sensor comprises an image recording circuit and an image processing circuit.

9. The lighting device of claim 1, wherein the communication circuit is configured to receive the one or more second messages via the power/communication link, and wherein the one or more first messages comprise an indication for the at least one lighting load to turn off based on the one or more second messages comprising the indication of vacancy in the space.

10. The lighting device of claim 1, wherein the one or more first messages comprise an indication for the at least one lighting load to turn on based on the one or more second messages comprising the indication of the occupancy condition in the space.

11. A method comprising:

transmitting, via a power/communication link configured for providing power and communication within a lighting device, one or more first messages to control at least one lighting load installed in at least one first segment of the lighting device;

detecting, via an occupancy sensor installed in at least one second segment of the lighting device, at least one of an occupancy condition or a vacancy condition in a space, wherein the occupancy sensor is connected to the power/communication link; and transmitting, via the occupancy sensor in response to the detection of the at least one occupancy condition or a vacancy condition in a space, one or more second messages via the power/communication link, the one or more second messages comprising an indication of the at least one of the occupancy condition or the vacancy condition in the space.

12. The method of claim 11, wherein the at least one first segment comprises a plurality of separate lighting segments, wherein the one or more first messages control at least one corresponding lighting load in each of the plurality of separate lighting segments.

13. The method of claim 12, wherein each lighting segment of the plurality of separate lighting segments is configured for independent communication on the power/communication link using a corresponding identifier included in the one or more first messages for controlling the corresponding lighting load.

14. The method of claim 12, wherein each lighting segment of the plurality of separate lighting segments is attachable to and detachable from at least one other lighting segment of the plurality of separate lighting segments.

15. The method of claim 12, wherein each lighting segment of the plurality of separate lighting segments is associated with a respective zone.

16. The method of claim 15, wherein each lighting segment of the plurality of separate lighting segments independently communicates via the power/communication link using a unique zone identifier for the respective zone.

17. The method of claim 11, wherein the occupancy sensor is mechanically connected to a first segment of the at least one first segment.

18. The method of claim 11, wherein the power/communication link comprises a wired power/communication link, and wherein the occupancy sensor comprises an image recording circuit and an image processing circuit.

19. The method of claim 11, wherein the one or more first messages comprise an indication for the at least one lighting load to turn off based on the one or more second messages comprising the indication of vacancy in the space.

20. The method of claim 11, wherein the one or more first messages comprise an indication for the at least one lighting load to turn on based on the one or more second messages comprising the indication of the occupancy condition in the space.

* * * * *